(12) United States Patent  
Bridges

(10) Patent No.: US 6,298,740 B1  
(45) Date of Patent: Oct. 9, 2001

(54) ADJUSTABLE ROTATIONAL TRANSMISSION ASSEMBLY

(76) Inventor: Justin C. Bridges, 3439 E. Lazy La., Phoenix, AZ (US) 85028

(*) Notice: Subject to any disclaimer, the term of this patent is extended or adjusted under 35 U.S.C. 154(b) by 0 days.

(21) Appl. No.: 09/272,836

(22) Filed: Mar. 19, 1999

(51) Int. Cl.$^7$ ................................................. F16H 29/20
(52) U.S. Cl. .......................... 74/120; 74/594.2; 74/119; 74/120
(58) Field of Search ................. 74/594.3, 594.2, 74/594.1, 120, 121, 118, 119, 117, 116

(56) References Cited

U.S. PATENT DOCUMENTS

| | | | |
|---|---|---|---|
| 3,046,804 | * 7/1962 | Mackintosh | 74/120 |
| 3,129,595 | * 4/1964 | del Pino Svárez | 74/120 |
| 3,889,974 | 6/1975 | Kallander | 280/251 |
| 3,922,005 | 11/1975 | Bundschuh | 280/237 |
| 3,954,282 | 5/1976 | Hege | 280/251 |
| 3,984,129 | 10/1976 | Hege | 280/251 |
| 4,133,550 | 1/1979 | Brown | 280/210 |
| 4,271,712 | 6/1981 | White | 74/141 |
| 4,467,668 | 8/1984 | Tatch | 74/594.2 |
| 4,519,271 | 5/1985 | Chattin | 74/594.3 |
| 4,574,649 | 3/1986 | Seol | 74/138 |
| 4,630,839 | 12/1986 | Seol | 280/255 |
| 4,706,516 | 11/1987 | Xi | 74/594.1 |
| 5,095,772 | 3/1992 | Fortson | 74/594.3 |
| 5,261,294 | * 11/1993 | Ticer et al. | 74/594.1 |
| 5,833,257 | 11/1998 | Kohlheb et al. | 280/251 |

* cited by examiner

Primary Examiner—David Fenstermacher

(57) ABSTRACT

An adjustable rotational transmission assembly 10 coupled to and provides adjustment of final drive ratio for a driven device 12, such as a bicycle, moped, motorcycle, vehicle, etc. Transmission assembly 10 adjusts rotation or drive radius and drive circumference to adjust final drive ratio to the driven device 12. Transmission assembly 10 provides infinitely variable drive ratios within a range by adjusting the size of the drive circumference path for movement of drive cable/chain ends. Assembly 10 allows shifting or adjusting of drive ratio with or without requiring any drive rotation of assembly 10. A first example embodiment 14 of the present invention assembly 10 has adjustable transmission crank arms 22. Crank arms 22 are adjusted to retracted and extended positions. Retracted positions of the crank arms 22 provide smaller radial drive circumferences and thus smaller final drive ratios while extended positions of the crank arms 22 provide larger radial drive circumferences and thus larger final drive ratios. A second example embodiment 74 of the present invention assembly 10 has an angularly adjustable crank shaft 80. Drive ratios of embodiment 74 are adjusted by decreasing and increasing angular position of the crank shaft 80. Decreased angular positions of the crank shaft 80 provides decreased radial drive circumferences and thus smaller final drive ratios. Increased angular positions of the crank shaft 80 provides increased radial drive circumferences and thus larger final drive ratios.

16 Claims, 15 Drawing Sheets

ADJUSTABLE ROTATIONAL TRANSMISSION ASSEMBLY

FIELD OF INVENTION

The present invention relates to a transmission assembly, and, in particular, to an adjustable rotational transmission assembly for a driven device.

BACKGROUND OF INVENTION AND BRIEF DESCRIPTION OF THE PRIOR ART

Many driven devices, such as bicycles, motorcycles, motor vehicles, etc., require the use of a transmission assembly in order to translate driving forces to drive the driven device. Typically, these transmission assemblies allow the adjustment of the final drive ratios of these devices to optimize the translation of input power to the driven device.

For example, chain and sprocket with a deraileur assembly have been used and implemented on conventional bicycles. One problem with the chain and sprocket type assembly is that the gears are discrete. Also, the chain at times becomes misaligned from the sprocket and/or deraileur assembly causing inconvenience and possible injury to the cyclist. Furthermore, this type of assembly requires the cyclist to pedal in order to shift gears. Additionally, the use of chains to sprockets/gears does not allow for a smooth continuous transition between drive ratios.

Therefore, various transmission assemblies have been developed in attempting to overcome some of the above limitations of the chain, sprocket, and derailleur type transmission assembly. For example, transmission assemblies have been developed to provide infinitely variable drive ratios within a range to overcome having to only provide discrete gears/drive ratios. U.S. Pat. Nos. 3,889,974; 3,922,005; 3,954,282; 3,984,129; 4,271,712; 4,467,668; 4,574,649; 4,630,839 disclose examples of such infinitely variable drive ratio transmission assemblies, and these prior art patents are incorporated by reference herein. These transmission assemblies use cables and chains and various other components that act in a reciprocating manner. However, a problem with the transmission assemblies is that they require an up and down type motion or back and forth type motion of the pedals or driving devices. A user of these transmission assemblies find these types of motions unsatisfactory since they are more accustomed to a fluid circular driving motion of the pedals/driving devices. Therefore, the use of these transmission assemblies may provide discomfort to the user.

Thus, transmission assemblies that allow adjustment of the pedal arm lengths were developed. U.S. Pat. Nos. 4,706,516; 4,519,271; 5,095,772 disclose examples of such transmission assemblies, and these prior art patents are incorporated by reference herein. These transmission assemblies provided a circular driving motion for the user. However, these types of transmission assemblies still did not provide a very fluid or comfortable motion for the user since the user would have to extend or retract his/her legs or pedaling motions respectively according to the adjustment of the transmission assemblies.

Therefore, transmission assemblies that provide infinitely variable drive ratios within a range, that implement reciprocating components, and that provide a circular driving motion for the user were developed. U.S. Pat. Nos. 4,133,550 and 5,833,257 disclose specific examples of such transmission assemblies, and these prior art patents are incorporated by reference herein. However, the need and desire to develop and improve these types of transmission assemblies and provide new apparatuses and methods to implement such transmission assemblies continues to exist.

Therefore, the present invention discloses and provides an adjustable rotational transmission assembly, and the present invention overcomes the problems, disadvantages, and limitations of the prior art.

SUMMARY OF INVENTION

Set forth is a brief summary of the invention in order to solve the foregoing problems and achieve the foregoing and other objects, benefits, and advantages in accordance with the purposes of the present invention as embodied and broadly described herein.

It is an object of the invention to provide a new and improved transmission assembly.

It is another object of the invention to provide an adjustable rotational transmission assembly.

It is a further object of the invention to provide a new and improved transmission assembly that provides infinitely variable drive ratios within a range, that implements reciprocating components, and that provides a circular driving motion for the user.

It is another object of the invention to provide a new and improved transmission assembly that provides continuous smooth transition between adjustment of drive ratios.

It is a further object of the invention to provide a new and improved transmission assembly that allows adjustment of drive ratios with or without the requirement of application of external force in driving the transmission assembly.

It is another object of the invention to provide a new and improved transmission assembly that provides continuous and smooth translation of input power or force to driving power or force.

It is a further object of the invention to provide a new and improved transmission assembly that provides continuous and smooth translation of circular motion to reciprocating motion.

It is another object of the invention to provide an adjustable rotational transmission assembly to be used in and coupled to driving components and/or shifting components of a driven device, such as a bicycle, motorcycle, moped, motor vehicle, etc.

The above objects and advantages of the invention are achieved by a rotational transmission assembly for a driven device. The assembly comprises a transmission housing, an input power drive gear, and at least one reciprocating component attachment. The input power drive gear is rotatably coupled to the transmission housing and is able to be driven by external input power components of the driven device. The at least one reciprocating component attachment is rotatably coupled to the input power drive gear. The at least one reciprocating component attachment is positioned at a drive radius relative to a rotational axis of the input power drive gear, and at least one reciprocating component is attachable to the at least one reciprocating component attachment. Rotation of the input power drive gear causes the at least one reciprocating component attachment to move along a rotational drive circumference and be able to cause and provide reciprocating motion to the at least one reciprocating component. The assembly further comprises at least one bearing assembly that rotatably couples the input power drive gear to the transmission housing. A rotational mount assembly is tranversely mounted through and coupled to the input power drive gear. The rotation of the input power drive gear rotates the rotational mount assembly. The at least one reciprocating component attachment is rotatably coupled to the rotational mount assembly.

One example embodiment of the present rotational mount assembly further comprises at least one transmission assembly mount transversely coupled to an interior portion of the input power drive gear and at least one transmission crank arm mounted to the at least one transmission assembly mount. The at least one reciprocating component attachment is rotatably coupled to the at least one transmission crank arm. The at least one transmission assembly mount further comprises at least one transmission crank arm slide opening, and the at least one transmission crank arm slidingly mounts within the at least one transmission crank arm slide opening to allow adjustment of a position of the at least one transmission crank arm which adjusts the drive radius and the drive circumference and a final drive ratio to the driven device.

A shifter assembly is coupled to the at least one transmission crank arm wherein the shifter assembly adjusts the position of the at least one transmission crank arm. The shifter assembly further comprises a crank arm adjustment gear rotatably coupled to the at least one transmission assembly mount and engagingly coupled to the at least one transmission crank arm, a pinion gear coupled to the crank arm adjustment gear, at least one slide positioning component coupled to the transmission housing, a rack support guide slidably coupled to the at least one slide mounting component and slidably adjusted to various positions proximate the input power drive gear, at least one bearing fitted into the rack support guide, a rotating rack support rotatably coupled to the at least one bearing, and a rack gear attached to the rotating rack support and engagingly coupled to the pinion gear to drive the crank arm adjustment gear for adjusting the position of the at least one transmission crank arm. The rack support guide has at least one inner threaded portion and at least one inner sliding portion. The at least one slide positioning component is at least one adjustment threaded screw threadingly coupled to the at least one inner threaded portion and is also at least one slider pin slidingly coupled within the at least one inner sliding portion to slidably move the rack support guide relative to the input power drive gear. A shifter gear is coupled to the at least one adjustment threaded screw wherein the shifter gear is able to couple to a shift apparatus.

The input power drive gear, the rack support guide, the rotating rack support, the at least one bearing, and the at least one bearing assembly are each a generally hollow ring structure. The at least one transmission crank arm has gear teeth to engagingly couple to gear teeth of the crank arm adjustment gear. Two transmission crank arms are provided wherein one of the two transmission crank arms extends from one side of the input power drive gear and another of the two transmission crank arms extends from another side of the input power drive gear. The position of the at least one transmission crank arm is adjusted between various positions ranging from a minimum length position and a maximum length position. The minimum length position provides a minimum drive radius, a minimum rotational drive circumference, and a minimum final drive ratio to the driven device. The maximum length position provides a maximum drive radius, a maximum rotational drive circumference, and a maximum final drive ratio to the driven device.

Another example embodiment of the present rotational mount assembly further comprises a drive shaft, a collar coupled to the drive shaft, and a mounting pin coupled to the collar and further generally and diametrically mounted to the input power drive gear. The at least one reciprocating component attachment is rotatably coupled to the drive shaft. The drive shaft is pivotably coupled to the input power drive gear. The drive shaft is able to be adjusted in angular position relative to a transverse axis of the input power drive gear to allow adjustment of the drive radius and the drive circumference and a final drive ratio to the driven device.

A shifter assembly is coupled to the drive shaft. The shifter assembly adjusts the angular position of the drive shaft which adjusts the drive radius and the drive circumference and the final drive ratio to the driven device. The shifter assembly further comprises a pinion gear coupled to the collar, a rack positioning housing rotatably threaded into threaded portions of the transmission housing, a rotating rack support fitted into a bearing wherein the bearing with the rotating rack support is rotatably fitted into the rack positioning housing, and a rack gear attached to the rotating rack support and engagingly coupled to the pinion gear wherein the rack positioning housing is adjusted to various positions relative to the input power drive gear to adjust the angular position of the drive shaft. A shifter gear is coupled to the rack positioning housing wherein the shifter gear is able to couple to a shift apparatus.

The input power drive gear, the rack positioning housing, the rotating rack support, the bearing, and the shifter gear are each a generally hollow ring structure. The drive shaft is centrally and transversely mounted to the input power drive gear. Two reciprocating component attachments are provided. One of the two reciprocating component attachments is rotatably mounted to one end of the drive shaft and another of the two reciprocating component attachments is rotatably mounted to another end of the drive shaft. The angular position of the drive shaft is adjusted between various angles ranging from a minimum angle and a maximum angle. The minimum angle provides a minimum drive radius, a minimum rotational drive circumference, and a minimum final drive ratio to the driven device. The maximum angle provides a maximum drive radius, a maximum rotational drive circumference, and a maximum final drive ratio to the driven device.

The present assembly further comprises at least one reciprocating component having one end attached to the at least one reciprocating component attachment. The at least one reciprocating component is at least one cable or at least one chain. Another end of the at least one reciprocating component is attached to at least one free wheel hub of the driven device.

The present assembly further comprises a shift apparatus coupled to the rotational mount assembly. The shift apparatus adjusts components of the rotational mount assembly to control adjustment of a final drive ratio to the driven device. The shift apparatus is an electrically or mechanically controlled shift apparatus. The external input power components can include but are not limited to a pedal assembly wherein the pedal assembly provides external input power to the input power drive gear. A pedal assembly is coupled to the input power drive gear wherein the pedal assembly provides external input power to the input power drive gear. The pedal assembly further comprises a pedal crank gear coupled to the input power drive gear, a pedal crank shaft transversely and centrally mounted to the pedal crank gear, pedal crank arms wherein one of the pedal crank arms is coupled to one side of the pedal crank shaft and another of the pedal crank arms is coupled to another side of the pedal crank shaft, and a pedal coupled to each of the pedal crank arms. The driven device may be a bicycle, motorcycle, moped, motor vehicle, etc.

The above objects and advantages of the invention are also achieved by a method of translating generally circular motion to reciprocating linear motion. At least one reciprocating component attachment is positioned at a drive radius relative to a rotational axis of an input power drive gear. At least one reciprocating component is attachable to the at least one reciprocating component attachment. The input power drive gear is rotated causing the at least one reciprocating component attachment to move along a rotational drive circumference and at a final drive ratio and to provide reciprocating linear motion to the at least one reciprocating component. A rotational mount assembly is transversely and centrally mounted through and coupled to the input power drive gear. The at least one reciprocating component attachment is coupled to the rotational mount assembly. The rotational mount assembly is adjusted in order to adjust the drive radius and the rotational drive circumference of the at least one reciprocating component attachment and the final drive ratio.

At least one crank arm is provided for the rotational mount assembly. The at least one reciprocating component attachment is rotatably coupled to the at least one crank arm, and a position of the at least one crank arm is adjusted in order to adjust the drive radius and the rotational drive circumference. Alternatively, a drive shaft is provided for the rotational mount assembly. The at least one reciprocating component attachment is rotatably coupled to the drive shaft. The drive shaft is adjusted to an angular position to adjust the drive radius and the rotational drive circumference.

The above objects and advantages of the invention are further achieved by a method of adjusting a drive radius and a rotational drive circumference of a rotating transmission device. A gear is provided. A drive component is transversely mounted to the gear wherein the drive component has at least one drive end and the drive component is driven by the gear. The gear and the drive component are rotated. At least some components of the drive component are adjusted relative to the gear to set the drive radius and the rotational drive circumference of the at least one drive end. At least one position of the at least some components of the drive component is adjusted to set the drive radius and the rotational drive circumference. Alternatively, at least one angle of the at least some components of the drive component is adjusted to set the drive radius and the rotational drive circumference.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION

Figure 1:
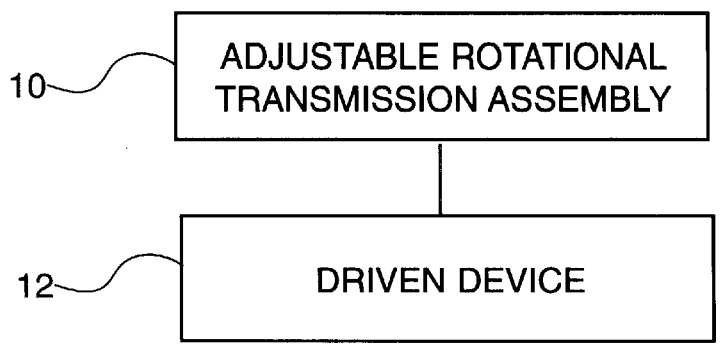
FIG. 1 is a block diagram of the present invention adjustable rotational transmission assembly coupled to a driven device.

The present invention is an adjustable rotational transmission assembly 10. Referring to FIG. 1, the transmission assembly 10 is coupled to and provides adjustment of final drive ratio for a driven device 12. The driven device 12 is a device that requires adjustment of final drive ratio, such as a bicycle, moped, motorcycle, vehicle, etc.. The present specification discloses the example of the transmission assembly 10 being used for a bicycle 5. However, the transmission assembly 10 is not in any way limited to being used only for a bicycle, and the present transmission assembly 10 may be used with any suitable driven device. Furthermore, the present specification discloses the example of the transmission assembly 10 receiving driving power from foot pedals of a bicycle. However, the transmission assembly 10 is not in any way limited to receiving power from foot pedals, and the present transmission assembly 10 may receive power from any suitable source (i.e. motor, engine, electric power, gas power, etc.).

The transmission assembly 10 is able to provide infinitely variable drive ratios within a range, and the present transmission assembly 10 achieves these variable ratios by adjusting the size of the drive circumference path for the movement of drive cable/chain ends (i.e. drive radius of the circular drive path is adjusted). For example, a conventional bicycle has a shift gear assembly with discrete gears (i.e. gears 1, 2, 3, 4, 5, 6, 7, 8, 9 . . . N). The present transmission assembly 10 replaces the conventional shift gear assembly and provides continuous gears within a range. In other words, the transmission assembly 10 provides continuous gears from 1 to N, which includes such gears as 1, 1.4, 2, 2.6, 3, 3.7, 4, 4.2, 5, 5.1, . . . N. The continuous gears of the present transmission assembly 10 are provided by adjusting the rotational drive radius from a gear 1 reference to a gear N reference. The present transmission assembly 10 also allows shifting or adjusting of the drive ratio with or without requiring any drive rotation of the transmission assembly 10. The transmission assembly 10 maintains a circular driving motion when translating circular movement from the power source to wheels of the driven device.

Figure 2:
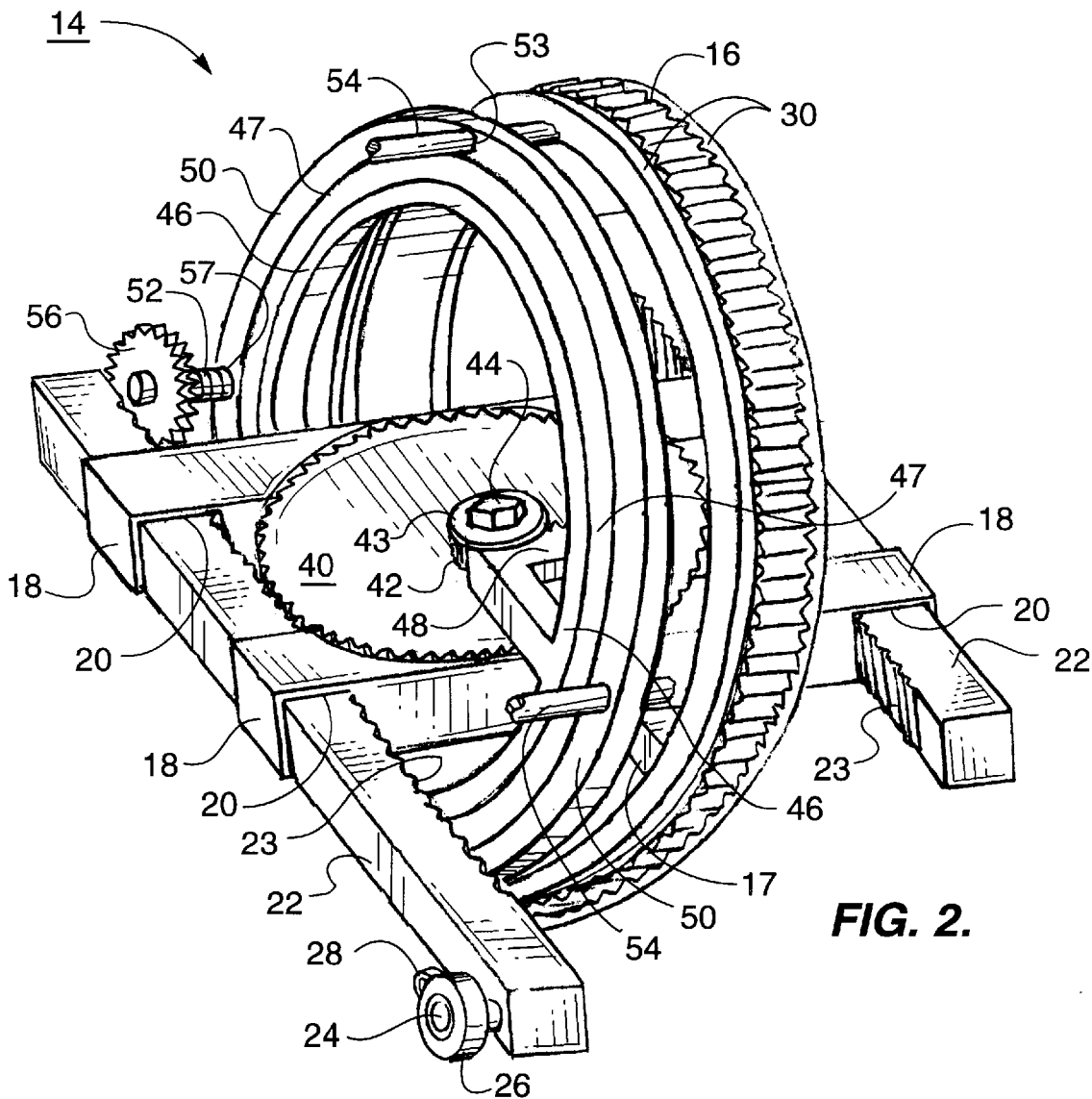
FIG. 2 is a perspective view of the preferred embodiment of the present invention adjustable rotational transmission assembly having adjustable transmission crank arms.
Figure 3:
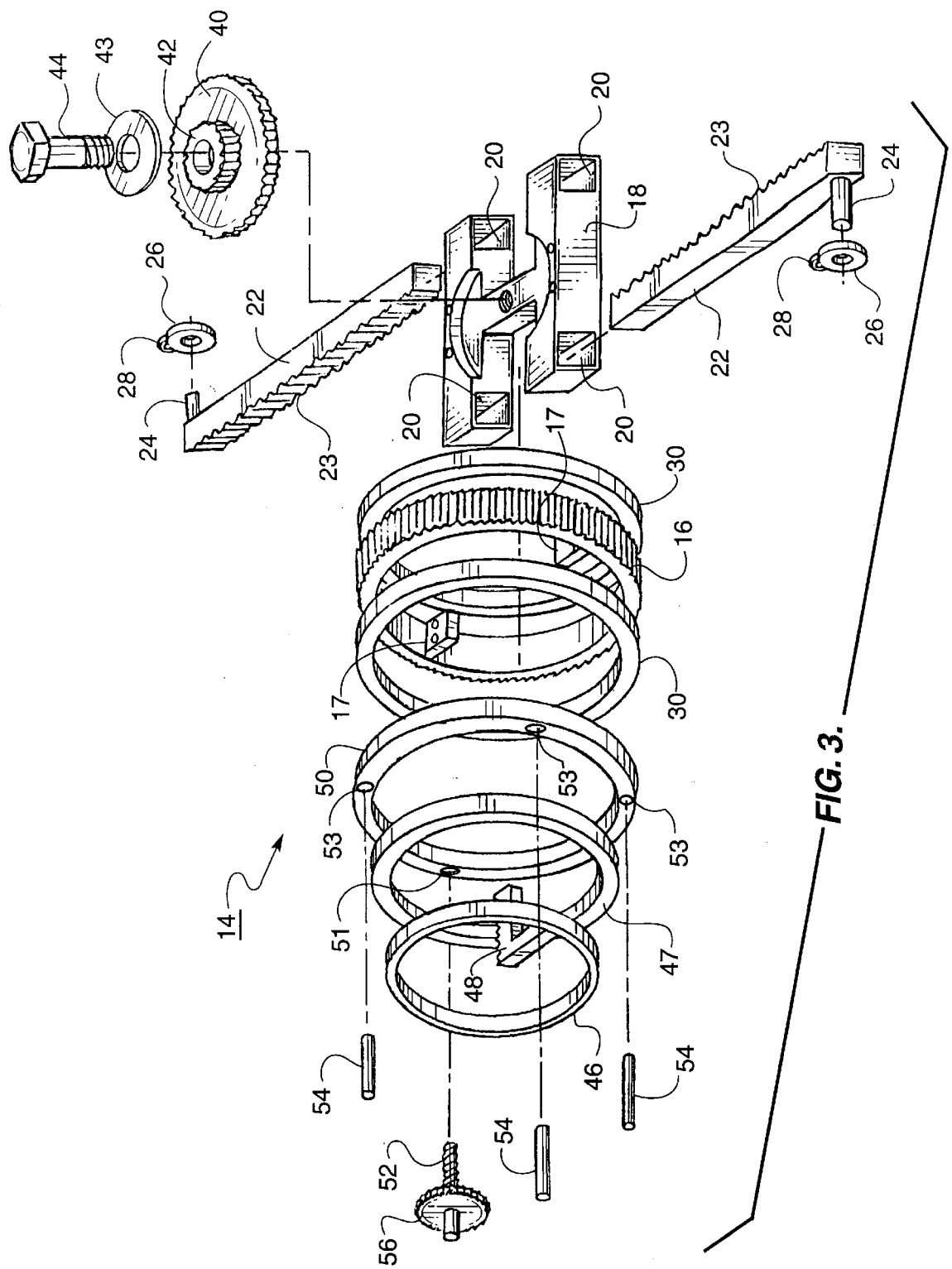
FIG. 3 is a perspective exploded view of the assembly of FIG. 2.

FIGS. 2 to 14 show a first preferred embodiment 14 of the present invention adjustable rotational transmission assembly 10 having adjustable transmission crank arms 22. Referring to FIGS. 2 and 3, the first embodiment assembly 14 has driving components and shifting components. The driving components of the first embodiment assembly 14 translates power from a power source to a driven component on the driven device, such as translating pedal power from a bicyclist to a wheel of a bicycle). The shifting components of the first embodiment assembly 14 allows the adjustment or shifting of the drive ratio from the power source to the driven component (i.e. shifting gears on a bicycle to change the drive ratio from the pedals to the wheel).

Figure 4:
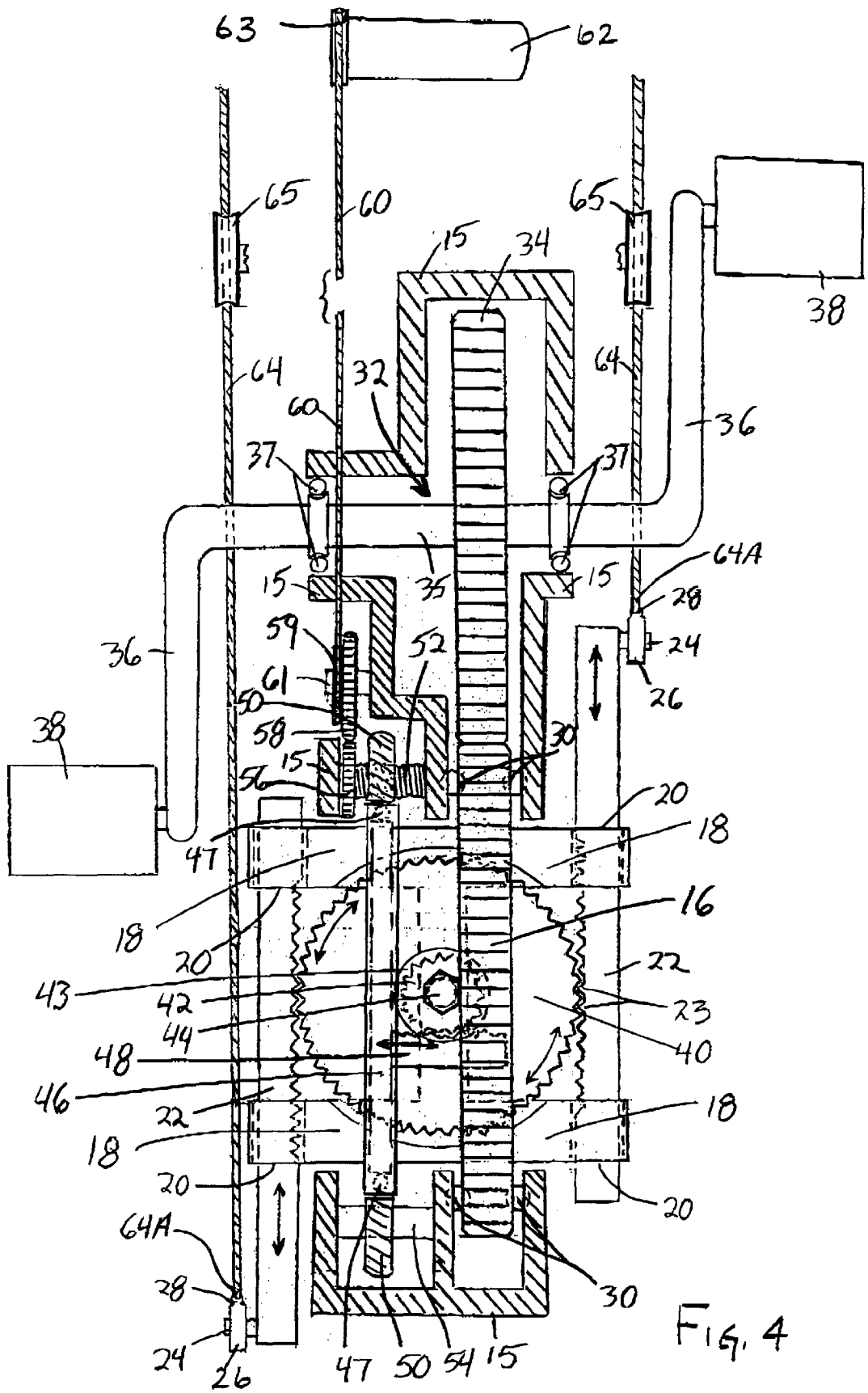
FIG. 4 is a top view of the assembly of FIG. 2 and of the pedal assembly and the shifter assembly.

The driving components include at least a transmission drive gear 16, transmission assembly mounts 18, and transmission crank arms 22. The transmission crank arms 22 are mounted through the transmission crank arm side openings 20 of the transmission assembly mounts 18 as shown in FIG. 2. The transmission drive gear 16 is a generally hollow circular ring having gear teeth. Mount receptacles 17 are located within the inner surface of the circular ring. The transmission assembly mounts 18 are transversely mounted through the transmission drive gear 16 by being inserted into the mount receptacles 17 (see FIG. 3). Referring to FIGS. 2, 3, and 4, the transmission gear bearings 30 are coupled to the transmission drive gear 16, and the gear 16 and bearings 30 are fitted into a transmission housing 15 to allow rotation of the gear 16 and bearings 30 therein. Therefore, the transmission drive gear 16 drivingly rotates the crank arms 22 and the assembly mounts 18.

Figure 6:
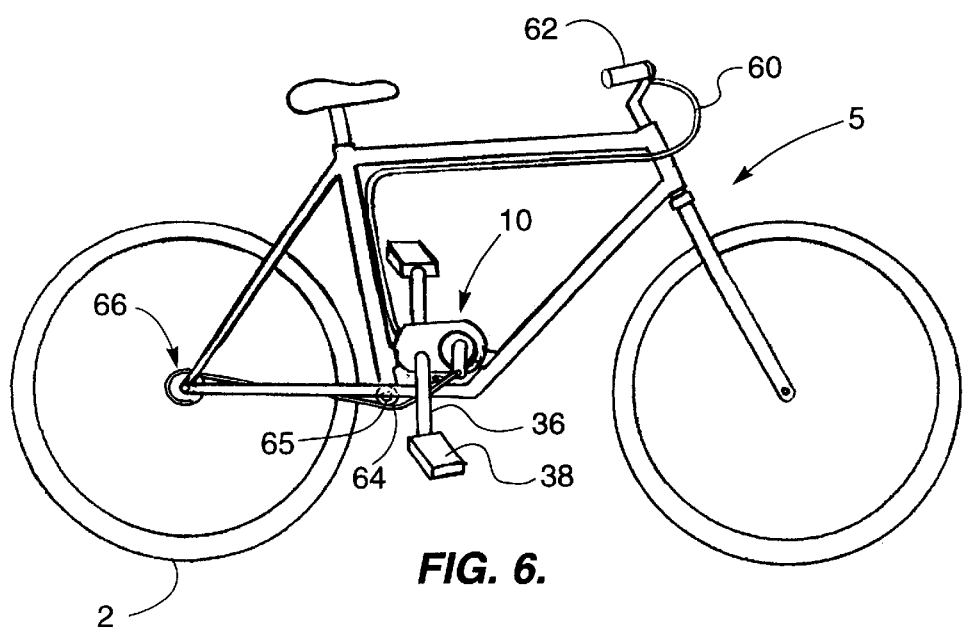
FIG. 6 is a side view of the assembly of FIG. 2 mounted and coupled to a bicycle.
Figure 7:
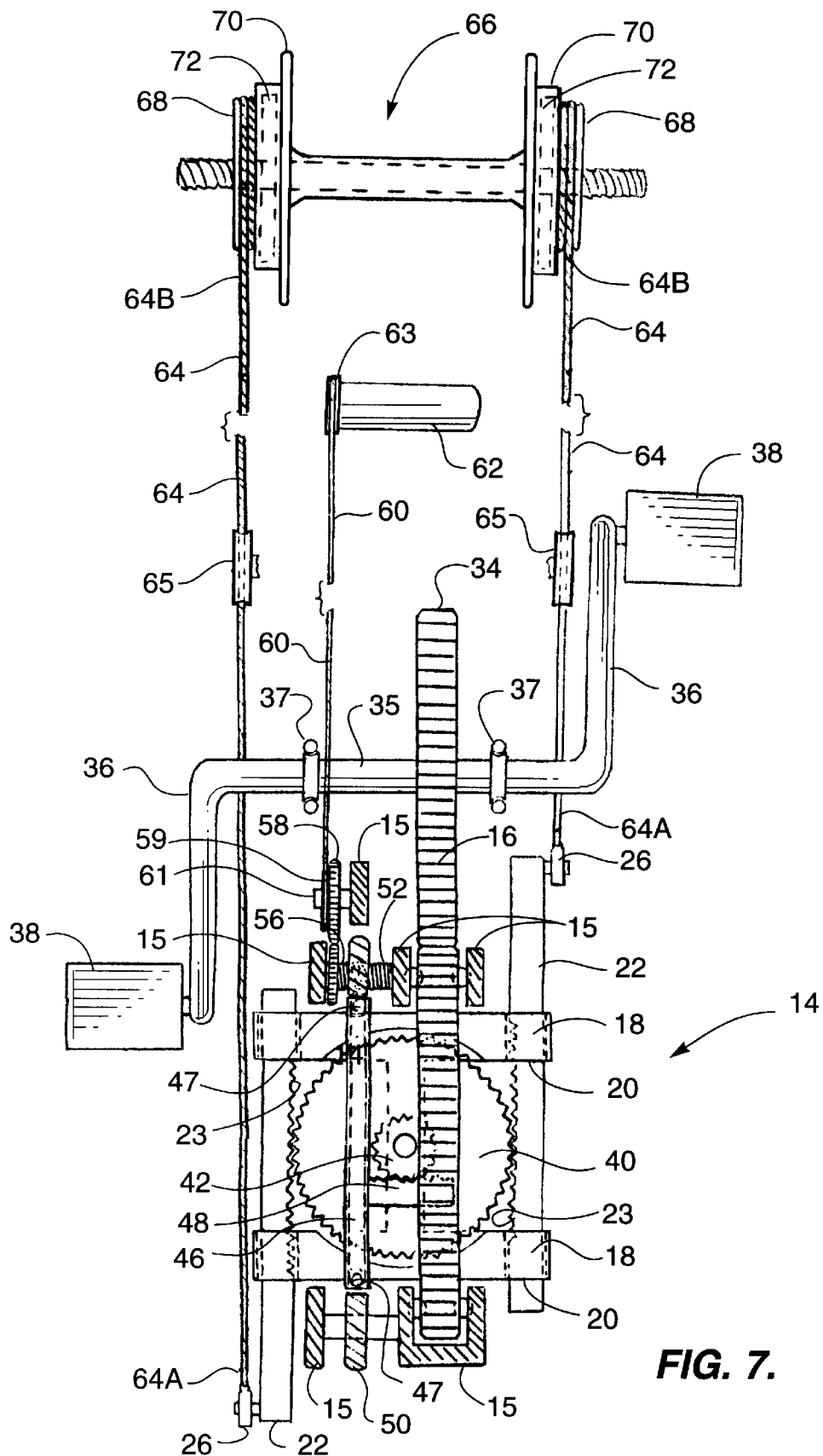
FIG. 7 is a more detailed top view of the assembly of FIG. 4 and of the free wheel hub assembly.

A bearing mounting pin 24 is located at a driving end of each of the crank arms 22. A cable/chain coupling bearing 26 is rotatably or swively mounted to the pin 24. The bearing 26 also has a cable/chain attachment 28. Referring to FIGS. 6 and 7, an end 64A of a drive cable/chain 64 is attached to each cable/chain attachment 28 wherein each end 64A is able to rotate or swivel relative to pin 24. The other end 64B of each drive cable/chain 64 is attached to a free wheel hub assembly 66 of a wheel 2 of bicycle 5. Each side of the free wheel hub assembly 66 has a clutch assembly 70 and a drive pulley 68 coupled thereto. Each clutch assembly 70 has a recoil spring 72. End 64B of each cable/chain 64 is attached to the drive pulley 68, and a certain length at end 64B of each cable/chain 64 is wound around the drive pulley 68. Each cable/chain 64 is positioned over or under a drive cable/chain positioning pulley 65. The pulleys 65 position the cables/chain 64 so that the cables/chains 64 are not in the way of other components or assemblies such as a pedal assembly 32.

Referring to FIGS. 4 to 7, the pedal crank assembly 32 is drivingly coupled to the transmission assembly 14. The pedal crank assembly 32 and the transmission assembly 14 are structurally mounted to a driven device, such as a bicycle. The pedal crank assembly 32 has a pedal gear 34, a pedal crank shaft 35, pedal crank arms 36, and pedals 38. The pedal gear 34 is drivingly coupled to the transmission drive gear 16 of the transmission assembly 14 by positioning and mounting the pedal crank assembly 32 relative to the transmission assembly 14. The pedal gear 34 is attached to the pedal crank shaft 35, and crank arms 36 are attached or made part of the crank shaft 35. Pedals 38 are rotatably coupled to ends of the crank arms 36.

The pedal crank assembly 32 is structurally mounted to the driven device, and bearings are used so that rotation of respective components of the pedal crank assembly 32 are still provided. For example, in FIGS. 4 and 7, pedal crank shaft bearings 37 are used to allow rotation of the pedal crank shaft 35 and the pedal gear 34 relative to the transmission assembly housing 15 which is structurally attached to the driven device.

Figure 8:
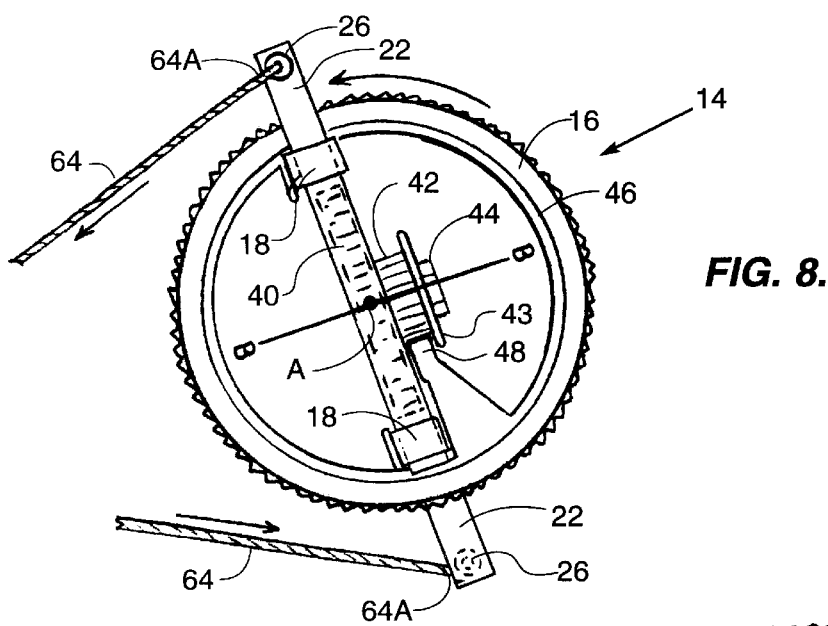
FIGS. 8 to 10 are side views of the transmission drive gear and the transmission crank arms of the assembly of FIG. 2 in rotation.
Figure 9:
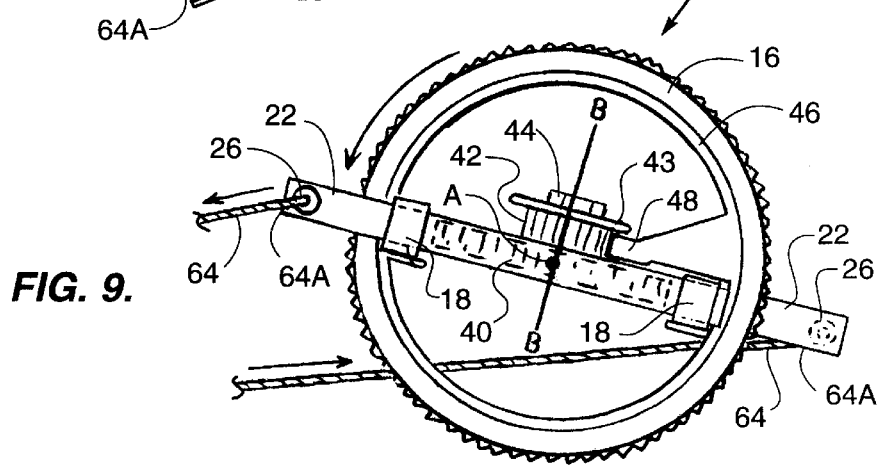
Figure 10:
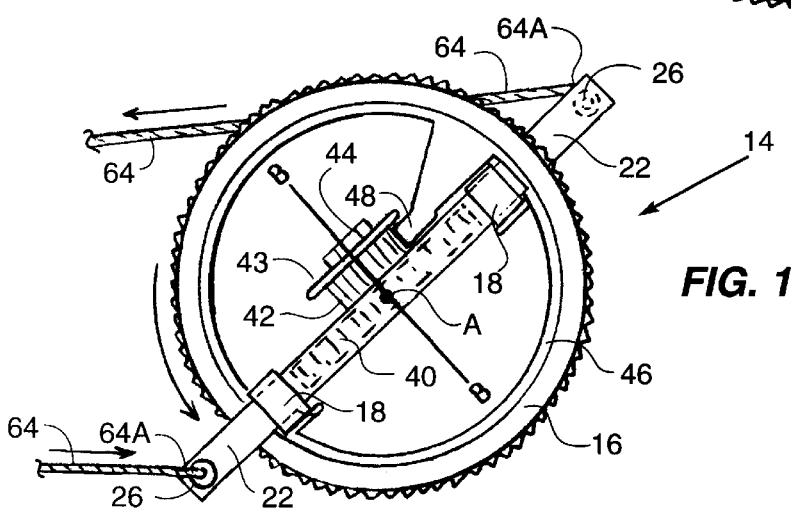

Therefore, as the power is applied to the pedals 38, the pedals 38 rotate the pedal crank arms 36 which, in turn, rotate the pedal crank shaft 35 and the pedal gear 34. The pedal gear 34 drivingly rotates the transmission drive gear 16 with the transmission crank arms 22. The rotation of the transmission crank arms 22 causes the attached ends 64A of the cables/chains 64 to rotate in continuous circular paths. Referring to FIGS. 8 to 10, the circular paths of the ends 64A provide an alternating drive motion for the cables/chains 64. The cables/chains 64 translate the circular path motions to reciprocating linear motions as shown in FIGS. 8 to 10. The reciprocating linear motions of the cables/chains 64 translate pull and recoil forces to the clutches 70. The clutches 70 translate the pull forces of the cables/chains 64 to rotate the free wheel hub assembly 66.

FIG. 8 shows the gear 16 rotating the cables/chains 64. In FIG. 9, one of the cables/chains 64 is approaching a maximum pulling length (i.e. providing pull forces to rotate the free wheel hub assembly 66) wherein the certain length of cable/chain 64 is unwound from the pulley 68. Furthermore, in FIG. 9, the other cable/chain 64 is approaching a maximum recoiling length wherein the certain length of cable/chain 64 is being rewound around the pulley 68 (i.e. recoil forces provided by its clutch 70 and spring 72 to rewind the cable/chain 64 around the pulley 68). The one cable/chain 64 stops providing pull forces after it has past its maximum pulling length, and the other cable/chain 64 stops being recoiled after it has past its maximum recoil length. In FIG. 10, the one cable/chain 64 then begins to recoil rewinding the cable/chain 64 onto its pulley 68, and the other cable/chain 64 starts providing pulling forces that unwind the cable/chain 64 from its pulley 68, thus providing pulling forces to the free wheel hub assembly 66. The cables/chains 64 alternate in providing pull forces to the clutches 70 to provide continuous forces to the free wheel hub assembly 66. In other words, one cable/chain 64 provides pull forces to engage the clutch to provide pull forces to the free wheel hub assembly 66 while the other cable/chain 64 is being recoiled onto the pulley 68 by the recoil spring 72 of the clutch 70. After the one cable/chain 64 has past its maximum pulling length and the other cable/chain 64 has past its maximum recoil length, the cables/chains 64 switch wherein the one cable/chain 64 is recoiled while the other cable/chain 64 provides pull forces to the free wheel hub assembly 66. This action alternates once with each rotation of the pedal crank arms 36.

Figure 11:
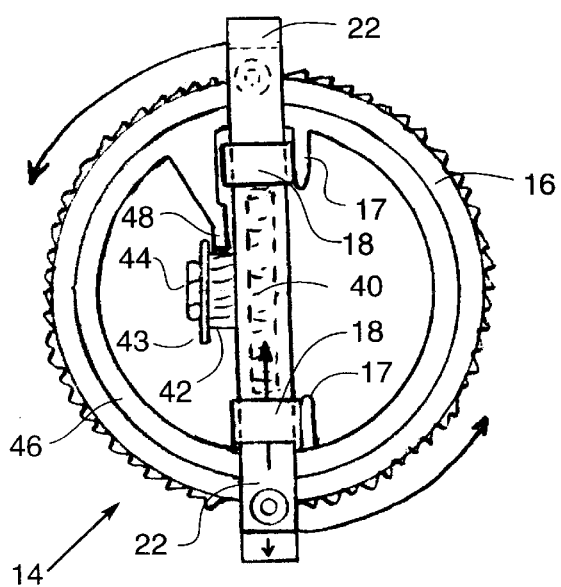
FIG. 11 is a side view of the transmission drive gear and the transmission crank arms wherein the transmission crank arms are adjusted to shorter lengths within an adjustment range to provide a lower gear.
Figure 12:
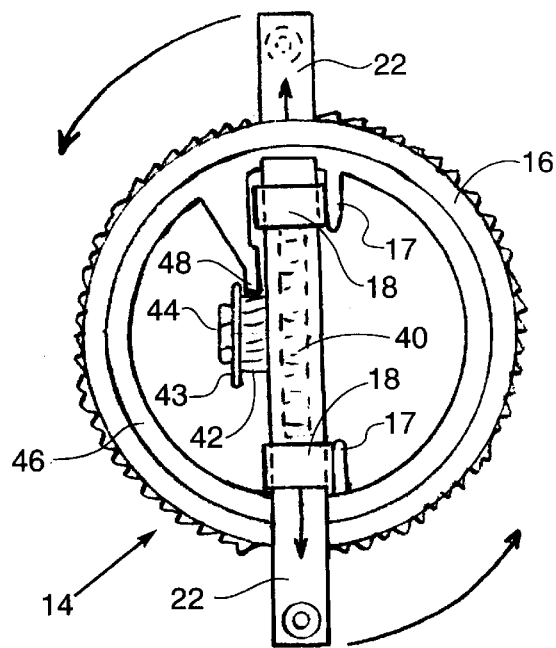
FIG. 12 is a side view of the transmission drive gear and the transmission crank arms wherein the transmission crank arms are adjusted to longer lengths within an adjustment range to provide a higher gear.
Figure 13:
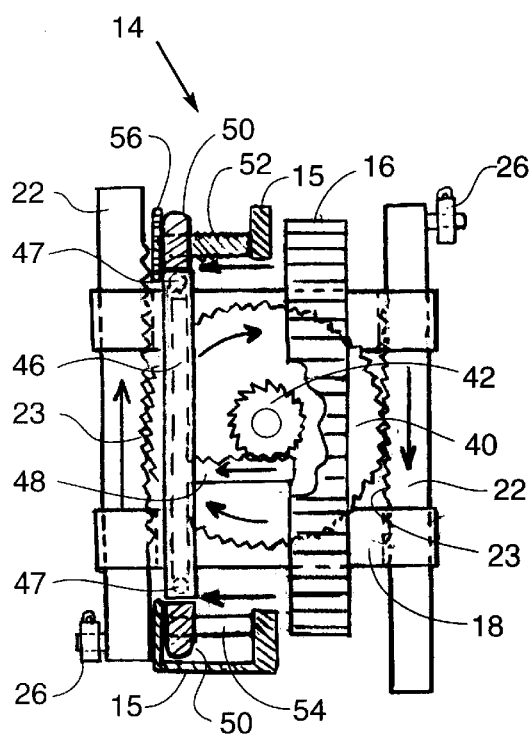
FIG. 13 is a top view of the assembly of FIG. 2 showing the shift assembly in a position for providing shorter transmission crank arms.
Figure 14:
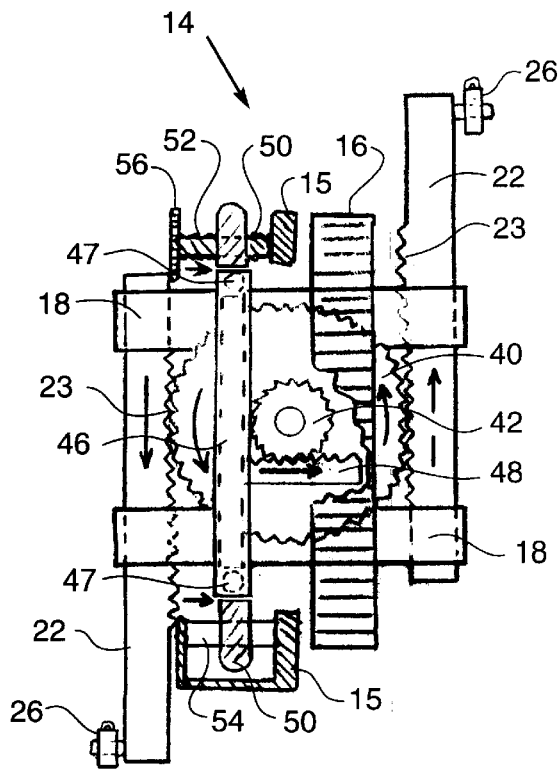
FIG. 14 is a top view of the assembly of FIG. 2 showing the shift assembly in a position for providing longer transmission crank arms.

FIGS. 2, 3, 4, 7, 13, and 14 show the shifting components of the first embodiment assembly 14. The shifting components include at least a crank arm adjustment gear 40, a pinion gear 42, a rotating rack support 46, a rack gear 48, and a rack support holder 50. The transmission crank arms 22 have crank arm gear teeth 23. The crank arm adjustment gear 40 is rotatably coupled to a generally central portion 19 of the transmission assembly 18. The pinion gear 42 is attached to the gear 40. The gear 40 and pinion gear 42 are coupled to a threaded bolt 44, and the threaded bolt 44 is mounted into an inner threaded portion 19 to allow gear 40 and pinion gear 42 to rotate thereat. The teeth of gear 40 engage the teeth 23 of crank arms 22 as shown in FIGS. 2, 4, 7, 13, and 14. FIG. 13 shows the gear 40 rotated in one direction (i.e. clockwise) to retract the transmission crank arms 22 to a retracted position within the transmission assembly mount 18 by sliding in a respective direction within the slide openings 20. FIG. 14 shows the gear 40 rotated in an opposite direction (i.e. counterclockwise) to extend the transmission crank arms 22 from the transmission assembly mount 18 to an extended position by sliding in an opposite direction within the slide openings 20. FIGS. 11 and 13 show that the retraction of the crank arms 22 provide a smaller radial drive circumference, and FIGS. 12 and 14 show that the extension of the crank arms 22 provide a larger radial drive circumference.

The retraction and extension of the crank arms 22 are achieved by rotating gear 40. Referring to FIGS. 2, 3, 4, 7, 13, and 14, rack gear 48 engages pinion gear 42 to rotate gear 40. The rack gear 48 is attached to and supported by a rotating rack support 46. The rack support 46 is a generally hollow ring structure wherein the rack gear 48 extends from an inner side of the ring structure towards the center. The rack support 46 is mounted adjacent the gear 16 wherein the transmission mount assembly 18 is also transversely mounted therethrough. The rack support 46 is fitted into a rack support bearing 47, and the rack support bearing 47 is held and guided by the rack support guide 50. An outer part/race of the bearing 47 and rack support guide 50 generally do not rotate while the inner part/race of the bearing 47 and the rack support 46 are allowed to rotate.

The rack support guide 50 has inner threads 51, and the support guide 50 is threadingly mounted to an adjustment threaded screw 52 wherein the inner threads 51 receive the threaded portion of the screw 52. The rack support guide 50 also has one or more pin openings 53, and the support guide 50 is slidingly mounted to a slider pin(s) 54 wherein the pin opening(s) 53 slidingly receives slider pin(s) 54. The threaded screw 52 is rotatably coupled to a portion of the housing 15, and the slider pin(s) 54 is attached to another portion of the housing 50. A shifter interface gear 56 is attached to the threaded screw 52, and the shifter interface gear 56 causes the threaded screw 52 to rotate within the inner threads 51. The gear 56 and ends of the threaded screw 52 are rotatably mounted to and supported by portions of the housing 15 as shown in FIGS. 4, 7, 13, and 14. The gear 56 and ends of the screw 52 remain in a generally fixed location but are able to rotate about a central axis of the screw 52. The rotation of the gear 56 causes the rack support guide 50 and the rack support 46 coupled thereto to move away (i.e. see FIG. 13) or towards (i.e. see FIG. 14) the pinion gear 42. The threaded portion of the screw 52 engages the threads 51 of the support guide 50 such that the support guide 50 generally moves from one end of the screw 52 to the other end of screw 52. As the support guide 50 moves along the screw 52, it correspondingly slides or moves along the slider pin(s) 54. Therefore, the rack gear 48 coupled to the rack support 46 moves away from the pinion gear 42 to cause the gear 40 move in one direction (i.e. clockwise) as shown in FIG. 13 thereby causing the crank arms 22 to retract as shown in FIGS. 11 and 13. As rack gear 48 coupled to the rack support 46 moves towards the pinion gear 42, it causes the gear 40 to move in another direction (i.e. counter-clockwise) as shown in FIG. 14 thereby causing the crank arms 22 to extend as shown in FIGS. 12 and 14.

In FIGS. 4 and 7, the gear 56 is engaged to a shifter gear 58. Attachment member 61 rotatably mounts gear 58 to the housing 15. A shifter gear pulley 59 is attached to the gear 58. Shifter cable 60 is positioned around the pulley 59. The cable 60 is further positioned around the twist shifter pulley 63. The twist shifter pulley 63 is attached to a twist shifter 62. The twist shifter 62 is able to be rotated by the user (i.e. twist shifter 62 mounted on or near a handle bar of a bicycle that allows the cyclist to shift or adjust final drive ratios). Alternatively, the shifter gear pulley 59 may be directly attached to the gear 56 thereby eliminating gear 58.

Figure 5:
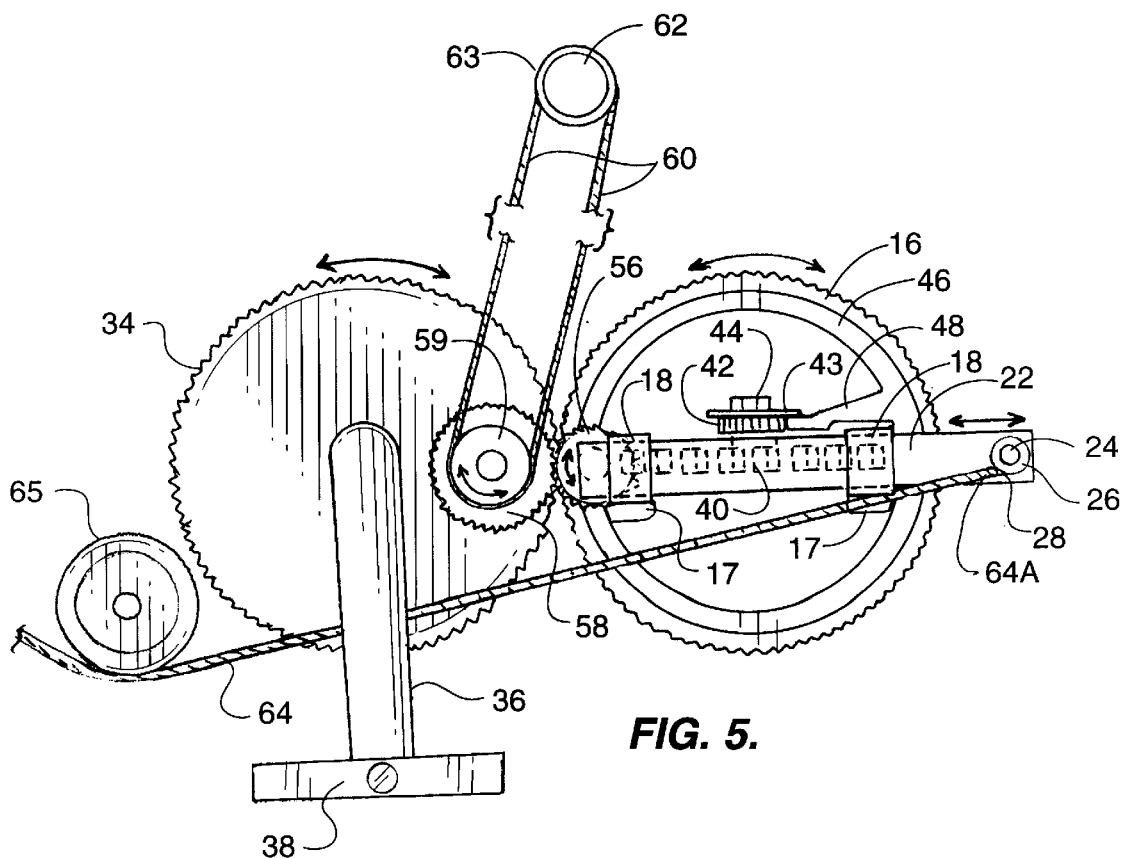
FIG. 5 is a side view of the assembly of FIG. 2.

The user adjusts or twists the twist shifter 62 in a desired direction (i.e. one direction would be for increasing final drive ratio or "gear" and another direction would be for decreasing final drive ratio or "gear"). Referring to FIG. 5, when the twist shifter 62 is rotated or twisted, the cable 60 causes the pulley 59 and gear 58 to rotate in a certain direction. The rotation of gear 58 causes gear 56 to rotate in an opposite direction, and gear 56 causes the rotating rack support 46 to move away or towards pinion gear 42. The rotation of the pinion gear 42 causes the transmission crank arms 22 to either retract or extend.

Power or force is applied to the pedal assembly 32. The pedal assembly 32 translates the rotational forces to the first embodiment transmission assembly 14. The translated rotational forces causes the gear 16 to rotate about an axis A in the manner shown in FIGS. 8 to 10. The assembly having coupled transmission crank arms 22, gear 40, pinion gear 42, and rack gear 48 accordingly rotate as shown in FIGS. 8 to 10. As this assembly rotates to the various positions such as shown in FIGS. 8 to 10, the pinion gear 42 remains in contact with the rack gear 48. A retaining washer 43 is positioned above the pinion gear 42 and is generally larger in diameter than the pinion gear 42 so that a portion of the washer 43 extends over at least a portion of the rack gear 48 to retain the rack gear 48 in engagement with the pinion gear 42 especially when the assembly is being rotated. Therefore, while gear 16 and the assembly are able to be rotated about the axis A, components of the assembly are able to be rotated, moved, or adjusted about other axes or to other positions. For example, while gear 16 and the assembly are able to be rotated about the axis A, gear 40 is still able to be rotated about the axis B. Furthermore, rotation of components about axis A is independent of rotation of components about axis B. Therefore, shifting or adjusting of drive ratios may occur whether or not the drive gear 16 is being rotated (i.e. whether or not force is being applied to the pedals 38). Also, the drive gear 16 and assembly may be rotated in either direction. Therefore, the user may pedal either in the conventional manner or back pedal, and the driven device or bicycle will still be driven in the forward direction.

Referring to FIGS. 11 and 12, drive ratios are adjusted by retracting and extending the crank arms 22 to respectively decrease and increase the radial drive circumference. The radial drive circumference provides the radial distance that the end 64 A of cable 64 travels during a revolution of the drive gear 16. Therefore, if the radial distance is decreased, a lower drive ratio (such as a lower gear) is provided, and if the radial distance is increased, a higher drive ratio (such as a higher gear) is provided. The smallest radial distance H that is able to be achieved would provide the lowest drive ratio reference (i.e. lowest gear reference) such as shown in FIG. 11 while the largest radial distance I that is able to be achieved would provide the highest drive ratio reference (i.e. highest gear reference) such as shown in FIG. 12. Continuous drive ratios are able to be achieved between the lowest and highest drive ratio references by being able to adjust the radial distance to any desired amount between the two references.

Figure 15:
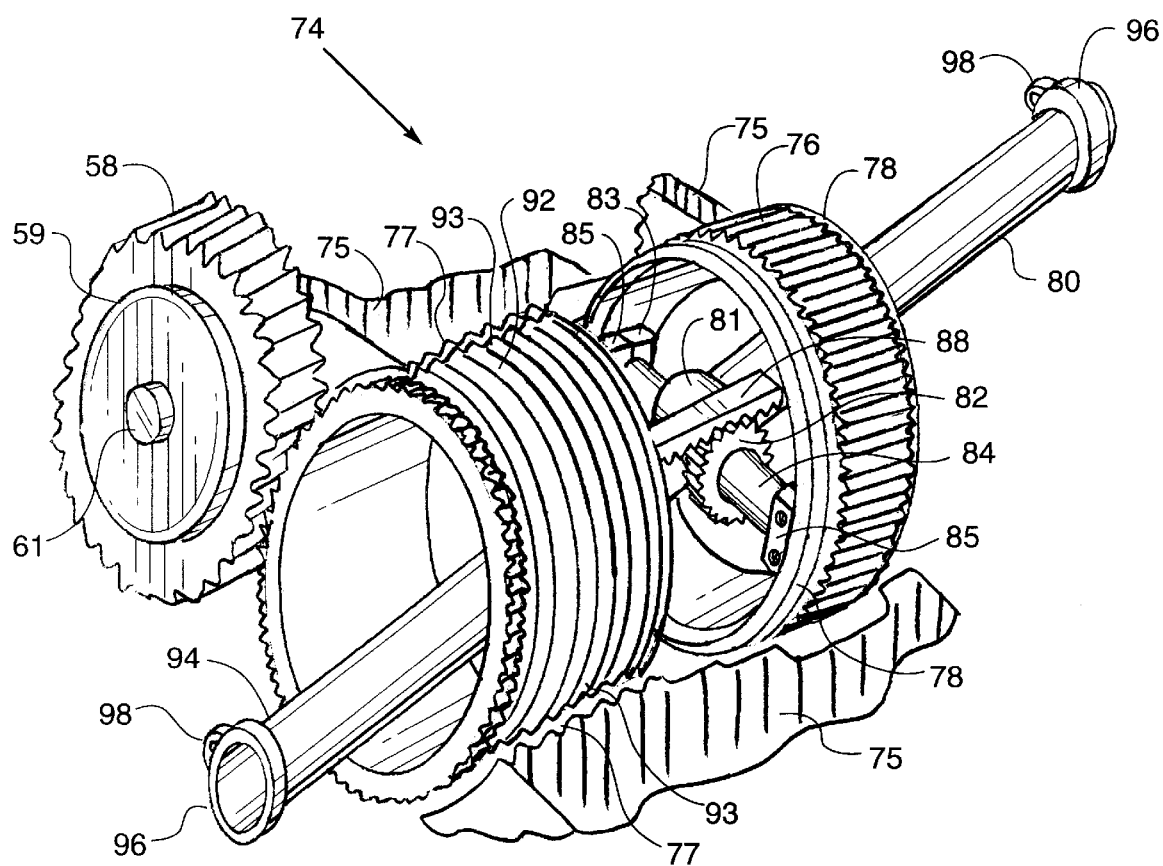
FIG. 15 is a perspective view of a second preferred embodiment of the present invention adjustable rotational transmission assembly having an angularly adjustable transmission crank shaft wherein the present assembly is coupled to a shift assembly.
Figure 16:
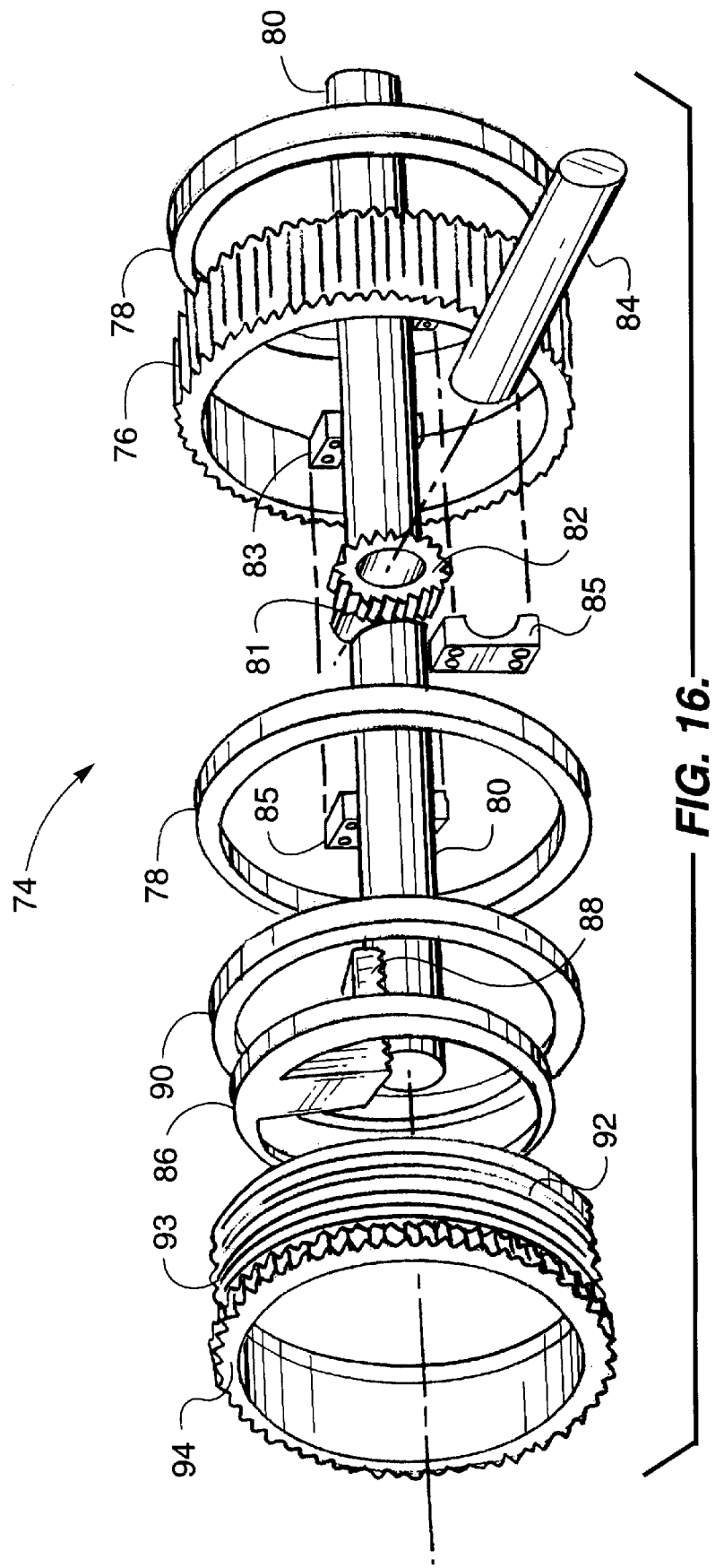
FIG. 16 is a perspective exploded view of the assembly of FIG. 15.

FIGS. 15 to 26 show a second embodiment transmission assembly 74 of the present invention adjustable rotational transmission assembly 10 with an angularly adjustable transmission crank shaft 80. Referring to FIGS. 15 and 16, the second embodiment assembly 74 also has driving components and shifting components. The driving components of the second embodiment assembly 74 translates power from a power source to a driven component on the driven device, such as translating pedal power from a bicyclist to a wheel of a bicycle). The shifting components of the second embodiment assembly 74 allows the adjustment or shifting of the drive ratio from the power source to the driven component (i.e. shifting gears on a bicycle to change the drive ratio from the pedals to the wheel).

Figure 17:
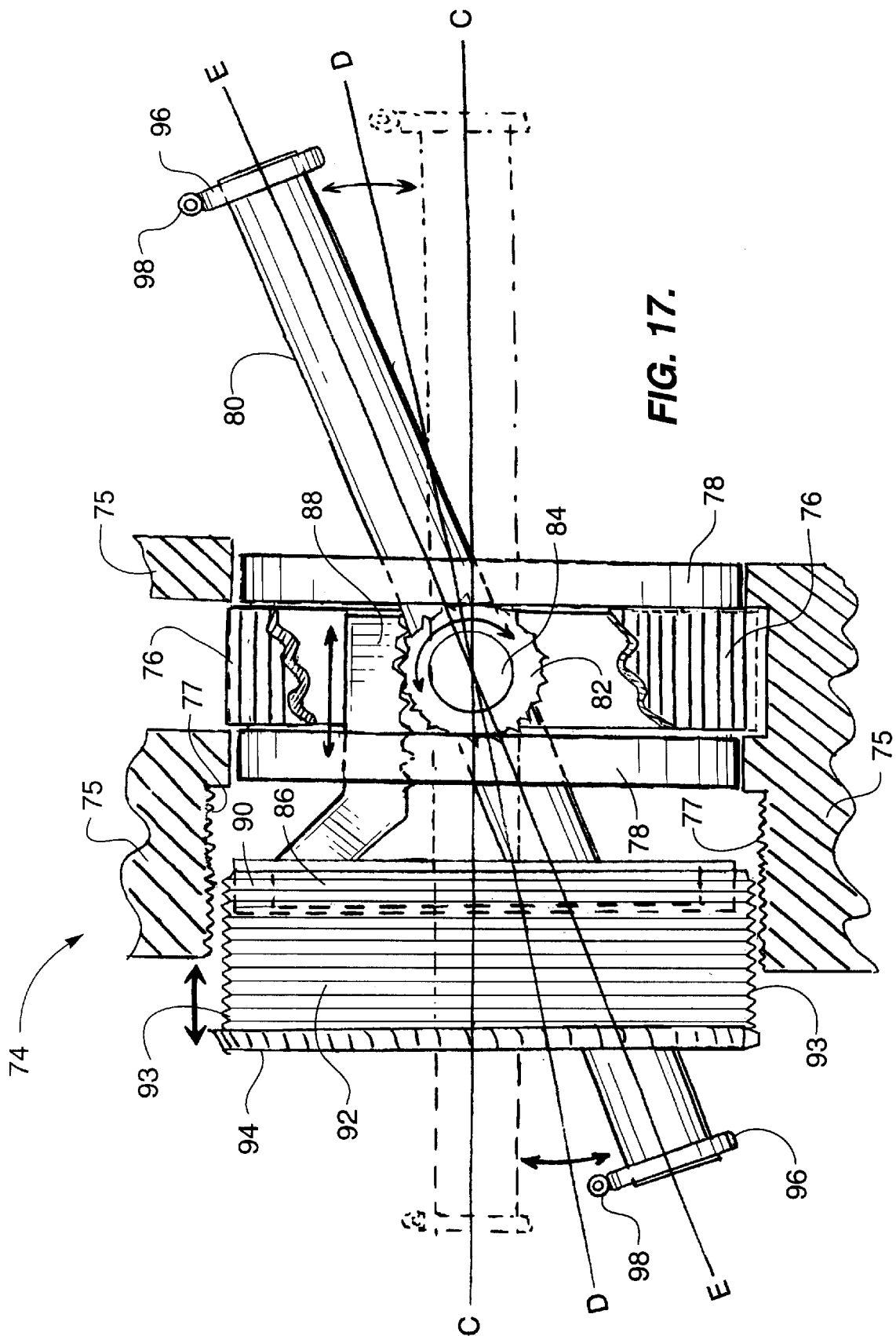
FIG. 17 is a front view of the assembly of FIG. 15.

Referring to FIGS. 15, 16, and 17, the driving components include at least a transmission drive gear 76, mounting bearings 78, and crank shaft 80. The drive gear 76 is a generally hollow circular ring having gear teeth. The mounting pin 84 is pressed fitted into a central collar 81 of the crank shaft 80. The mounting pin 84 is generally mounted along an inner diameter of the drive gear 76, and therefore, the crank shaft 80 is transversely mounted through the drive gear 76. Also, a pinion gear 82 is attached to the central collar 81 such that the pin 84 is mounted therethrough. The ends of mounting pin 84 is rotatably held by rotation caps 83 and 85. Rotation cap 83 is attached to the inner diameter of gear 76, and the rotation cap 85 is secured to the cap 83 after an end of the mounting pin 84 is held therein. The mounting pin 84 is able to rotate or pivot at the caps 83 and 85.

Referring to FIGS. 15 and 17, the mounting bearings 78 are coupled to the transmission drive gear 76, and the gear 76 and the bearings 78 are fitted into a transmission housing 75 to allow rotation of the gear 76 and bearings 78 therein. Therefore, the transmission drive gear 76 drivingly rotates the crank shaft 80 and the pin 84.

Figure 18:
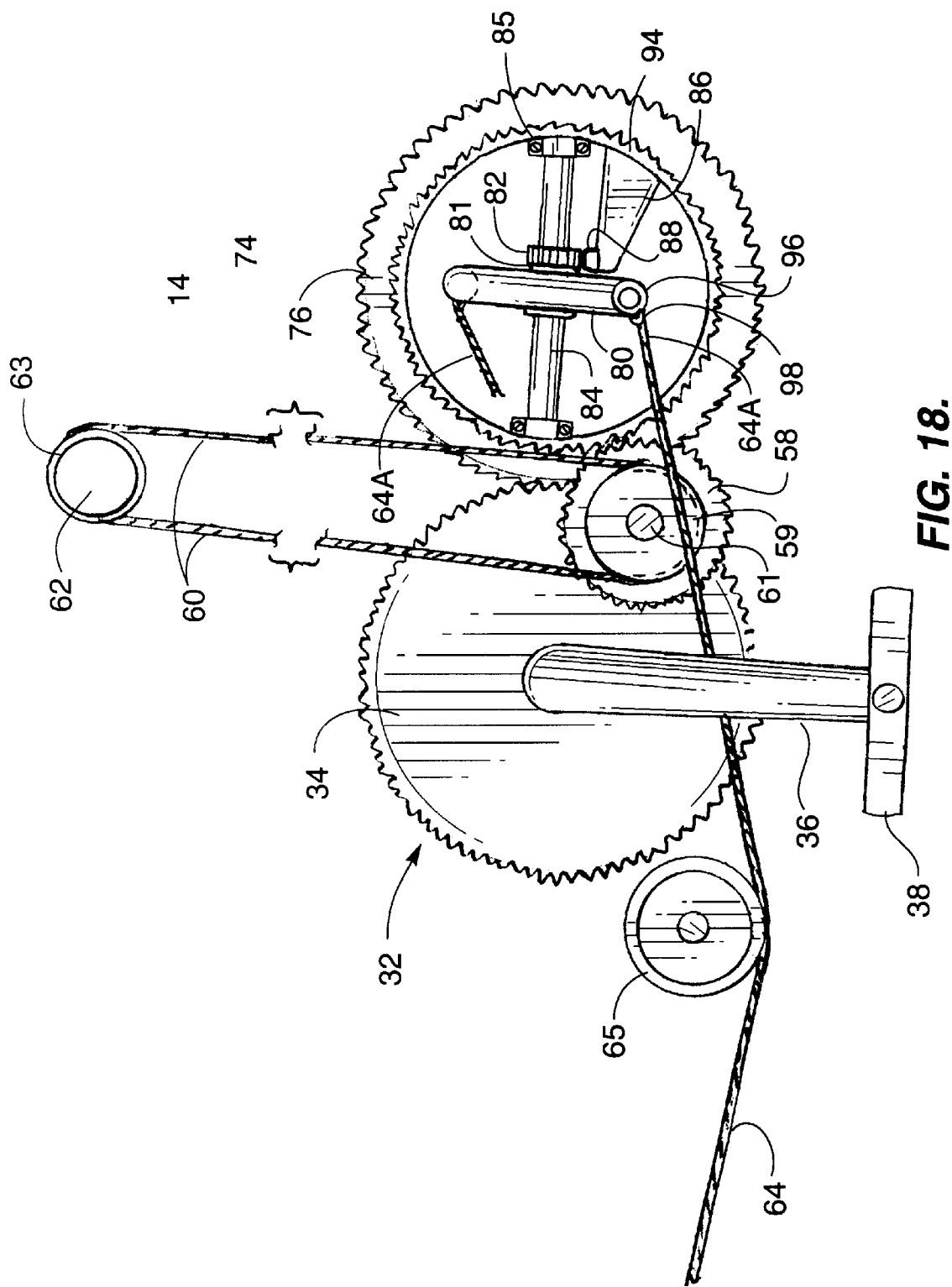
FIG. 18 is a side view of the assembly of FIG. 15 and the pedal assembly.
Figure 21:
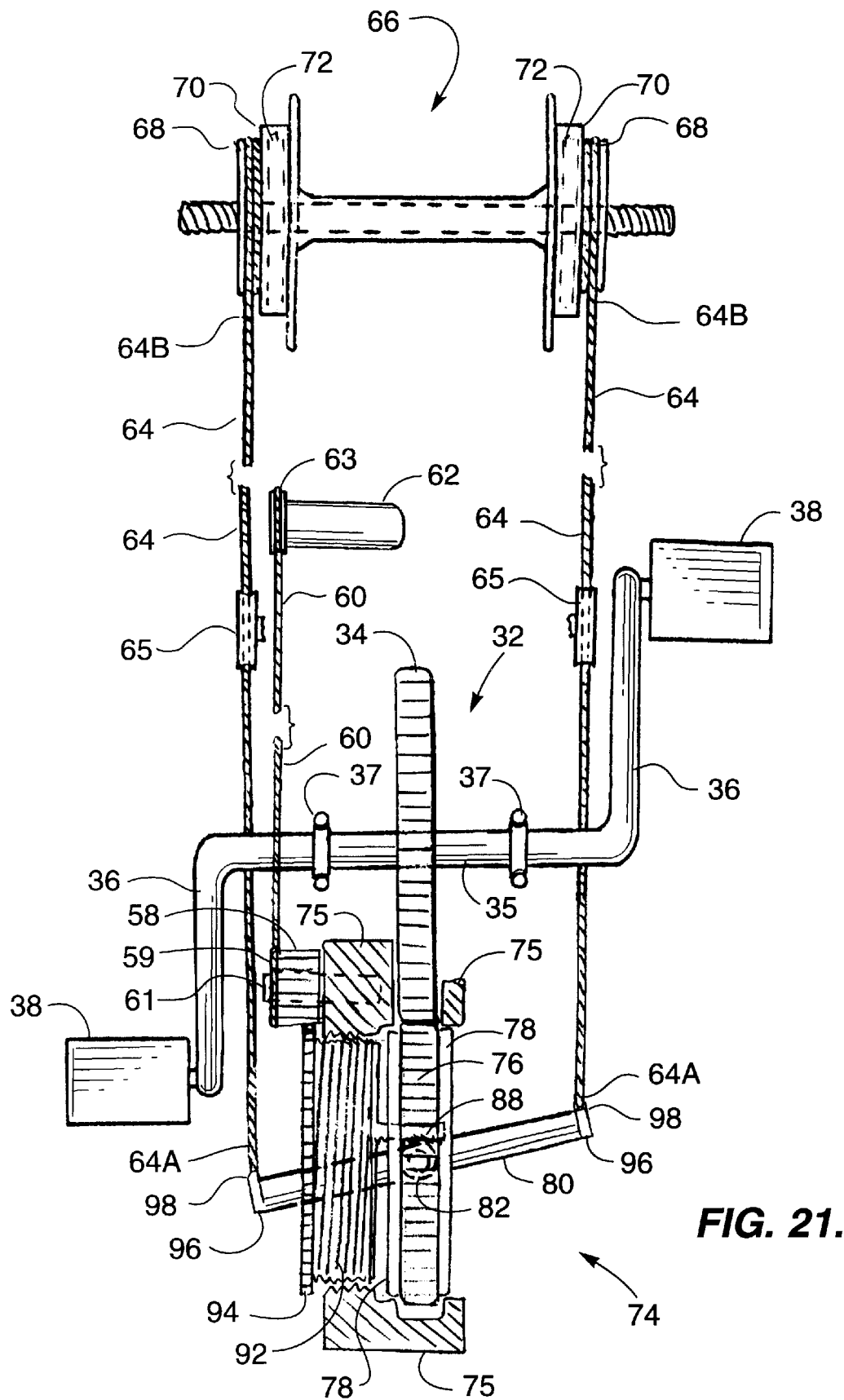
FIG. 21 is a more detailed top view of the present assembly of FIG. 18 and the free wheel hub.

A cable/chain coupling bearing 96 is located at each driving end of the crank shaft 80 and rotatably/swively coupled thereat. The bearing 96 also has a cable/chain attachment 98. Referring to FIGS. 18 and 21, an end 64A of each drive cable/chain 64 is attached to each cable/chain attachment 98 wherein each end 64A is able to rotate/swivel relative to crank shaft 80. The other end 64B of each drive cable/chain 64 is attached to a free wheel hub assembly 66 of a wheel 2 of bicycle 5 (i.e. shown in FIG. 6). Each side of the free wheel hub assembly 66 has a clutch assembly 70 and a drive pulley 68 coupled thereto. Each clutch assembly 70 has a recoil spring 72. End 64B of each cable/chain 64 is attached to the drive pulley 68, and a certain length at end 64B of each cable/chain 64 is wound around the drive pulley 68. Each cable/chain 64 is positioned over a drive cable positioning pulley 65. The pulleys 65 position the cables/chains 64 so that the cables/chains 64 are not in the way of other components or assemblies such as a pedal assembly 32.

Referring to FIG. 21, the pedal crank assembly 32 is drivingly coupled to the transmission assembly 74. The pedal crank assembly 32 and the transmission assembly 74 are structurally mounted to a driven device, such as a bicycle. The pedal crank assembly 32 has a pedal gear 34, a pedal crank shaft 35, pedal crank arms 36, and pedals 38. The pedal gear 34 is drivingly coupled to the transmission drive gear 76 of the transmission assembly 74 by positioning and mounting the pedal crank assembly 32 relative to the transmission assembly 74. The pedal gear 34 is attached to the pedal crank shaft 35, and crank arms 36 are attached or made part of the crank shaft 35. Pedals 38 are rotatably coupled to ends of the crank arms 36.

The pedal crank assembly 32 is structurally mounted to the driven device, and bearings are used so that rotation of respective components of the pedal crank assembly 32 are still provided. For example, in FIG. 21, pedal crank shaft bearings 37 are used to allow rotation of the pedal crank shaft 35 and the pedal gear 34 relative to the transmission assembly housing 75 which is structurally attached to the driven device.

Figure 22:
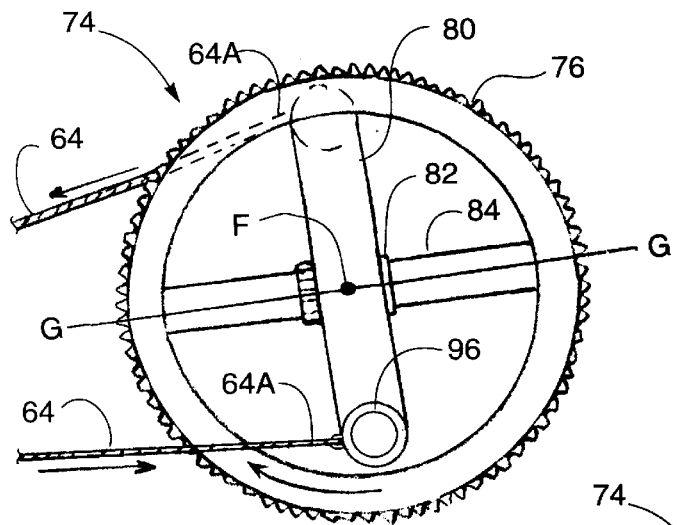
FIGS. 22 to 24 are side views of the transmission drive gear and the drive shaft of the assembly of FIG. 15 in rotation.
Figure 23:
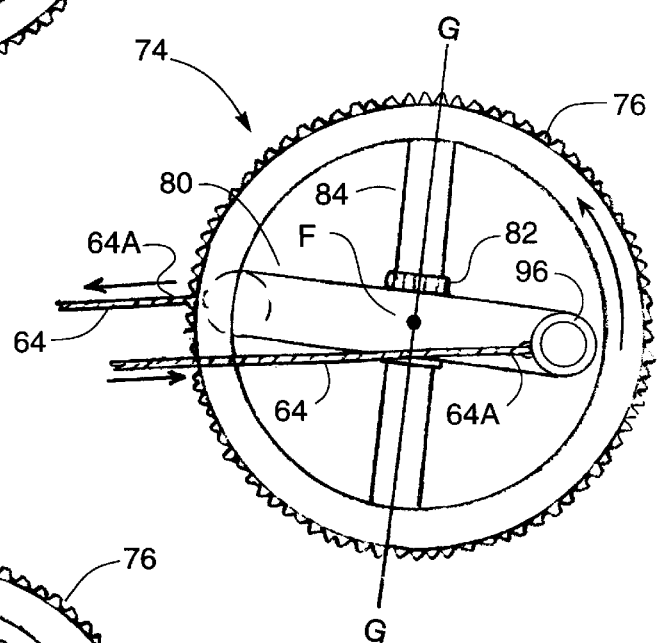
Figure 24:
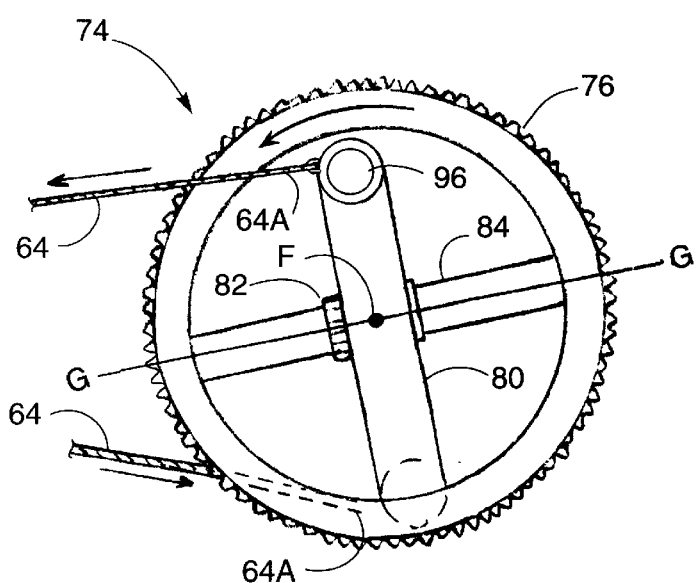

Therefore, as power is applied to the pedals 38, the pedals 38 rotate the pedal crank arms 36 which, in turn, rotate the pedal crank shaft 35 and the pedal gear 34. The pedal gear 34 drivingly rotates the transmission drive gear 76 with the transmission crank shaft 80. The rotation of the transmission crank shaft 80 causes the attached ends 64A of the cables/chains 64 to rotate in continuous circular paths. Referring to FIGS. 22 to 24, the circular paths of the ends 64A provide an alternating drive motion for the cables/chains 64. The cables/chains 64 translate the circular path motions to reciprocating linear motions as shown in FIGS. 22 to 24. The reciprocating linear motions of the cables/chains 64 translate pull and recoil forces to the clutches 70. The clutches 70 translate the pull forces of the cables/chains 64 to rotate the free wheel hub assembly 66.

FIG. 22 shows the gear 76 rotating the cables/chains 64. In FIG. 23, one of the cables/chains 64 is approaching a maximum pulling length (i.e. providing pull forces to rotate the free wheel hub assembly 66) wherein the certain length of cable/chain 64 is unwound from the pulley 68.

Furthermore, in FIG. 23, the other cable/chain 64 is approaching a maximum recoiling length wherein the certain length of cable/chain 64 is being rewound around the pulley 68 (i.e. recoil forces provided by its clutch 70 and spring 72 to rewind the cable/chain 64 around the pulley 68). The one cable/chain 64 stops providing pull forces after it has past its maximum pulling length, and the other cable/chain 64 stops being recoiled after it has past its maximum recoil length. In FIG. 24, the one cable/chain 64 then recoils to rewind the cable/chain 64 onto its pulley 68, and the other cable/chain 64 provides pulling forces that unwinds the cable/chain 64 from its pulley 68 to provide pulling forces to the free wheel hub assembly 66. The cables/chains 64 alternate in providing pull forces to the clutches 70 to provide continuous forces to the free wheel hub assembly 66. In other words, one cable/chain 64 provides pull forces to engage the clutch to provide pull forces to the free wheel hub assembly 66 while the other cable/chain 64 is being recoiled onto the pulley 68 by the recoil spring 72 of the clutch 70. After the one cable/chain 64 has past its maximum pulling length and the other cable/chain 64 has past its minimum recoil length, the cables/chains 64 alternate motion wherein the one cable is recoiled while the other cable/chain 64 provides pull forces to the free wheel hub assembly 66. This alternating action occurs once with each rotation of the pedal crank arms 36.

Figure 19:
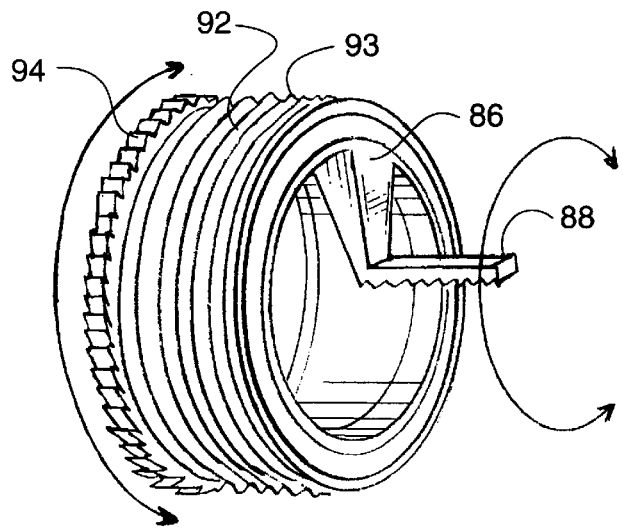
FIG. 19 is perspective view of a shifter rack assembly for the assembly of FIG. 15.
Figure 20:
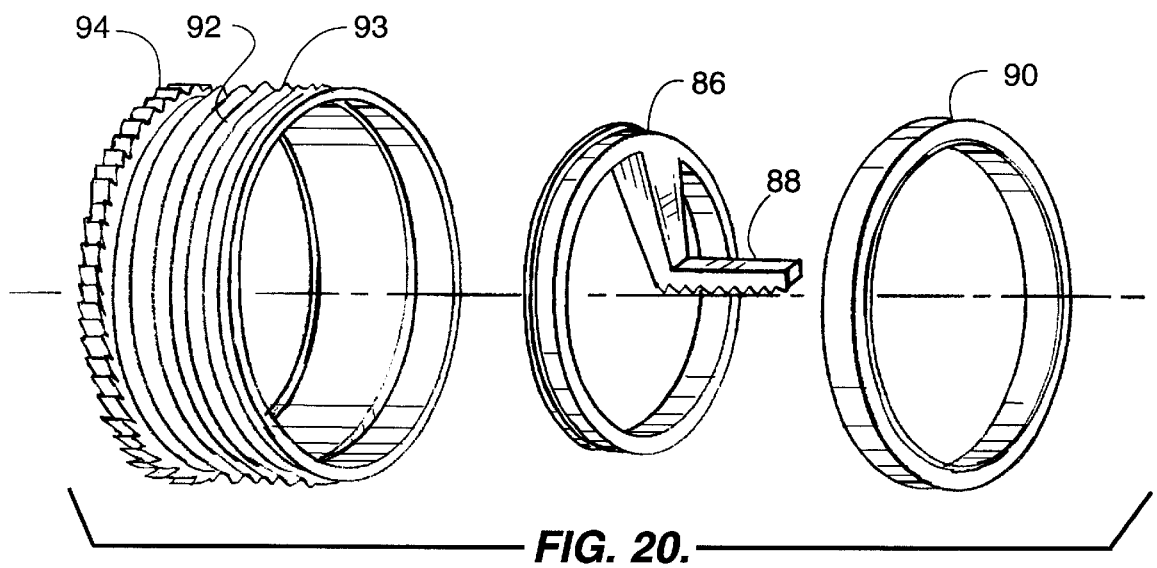
FIG. 20 is an exploded view of the shifter rack assembly of FIG. 19.

FIGS. 15, 16, 17, 19, and 20 show the shifting components of the second embodiment assembly 74. The shifting components include at least a rack positioning housing 92, a rack positioning gear 94, a rotating rack support 86, a rotating rack gear 88, and a rack support bearing 90. The housing 92, rack positioning gear 94, the support 86, and the bearing 90 are all generally hollow circular ring structure. Referring to FIGS. 19 and 20, the rotating rack support 86 is fitted into the bearing 90. The support 86 and bearing 90 are, in turn, fitted into the housing 92. FIG. 19 shows the shifting components fitted together as a shifting assembly. The support 86 and the rack gear 88 are able to rotate within the housing 92 via bearing 90. The housing 92 has external threads 93 along its outer area. The external threads 93 of housing 92 threadingly engage internal threads 77 of the housing 75 as shown in FIG. 17. The housing 75 is positioned relative to the drive gear 76 such that the teeth of rack gear 88 engage the teeth of the pinion gear 82 as shown in FIGS. 15 and 17. Also, a driving end of the crank shaft 80 extends through the housing 92 and rack positioning gear 94 as shown in FIG. 17. FIG. 17 shows the pinion gear 82 pivotably rotated by the rack gear 88. The pinion gear 82 rotates the crank shaft 80 between a horizontal position and a highest angular position. The horizontal position defines a zero drive ratio reference (i.e. gear zero or neutral gear) along the line C. A slightly angular position for the crank shaft 80 defines a lowest drive ratio reference (i.e. lowest gear) along the line D. The highest angular position defines a highest drive ratio reference (i.e. highest gear) along the line E.

Figure 25:
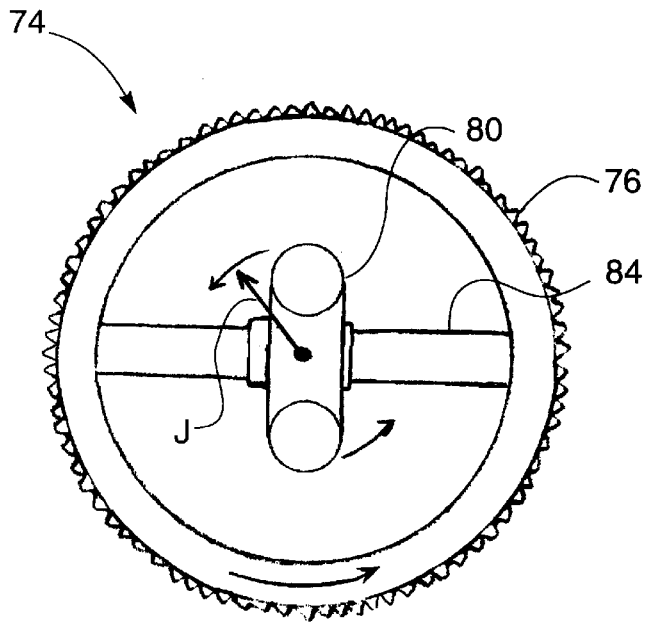
FIG. 25 is a side view of the transmission drive gear and the drive shaft wherein the drive shaft is adjusted to a lower angle from a zero reference to provide a lower gear.
Figure 26:
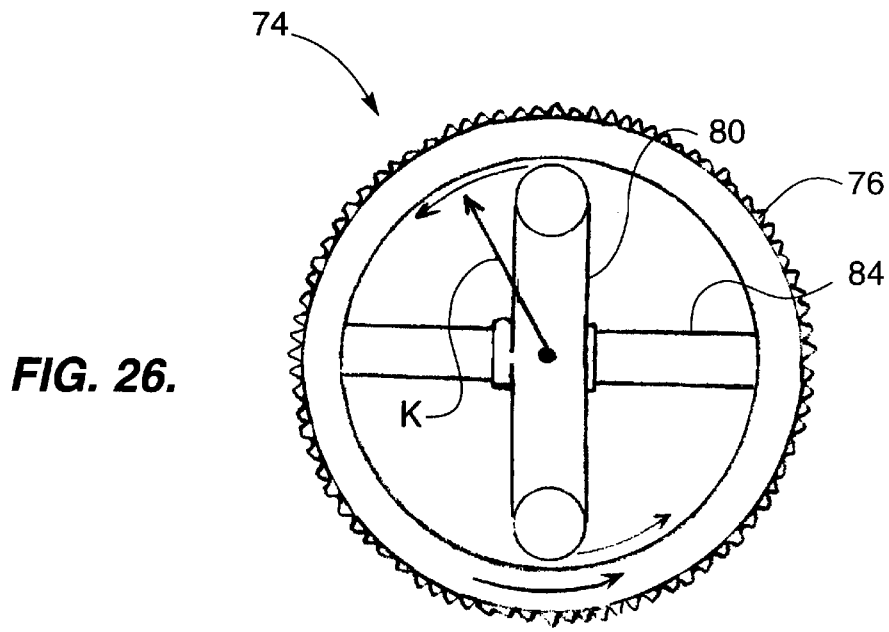
FIG. 26 is a side view of the transmission drive gear and the drive shaft wherein the drive shaft is adjusted to a higher angle from a zero reference to provide a higher gear.

Referring to FIGS. 17 and 25, when the crank shaft 80 is at or closer to the line D drive ratio reference, then a smaller radial drive circumference is provided. Referring to FIGS. 17 and 26, when the crank shaft 80 is at or closer to the line E drive ratio reference, then a larger radial drive circumference is provided. The angular positioning of the crank shaft 80 is achieved by threadingly rotating housing 92 within housing 75. Referring to FIG. 17, rack gear 88 engagingly rotates pinion gear 82 to angularly position the crank shaft 80.

Referring to FIGS. 18 and 21, a rack positioning gear 94 is engaged to a shifter gear 58. Attachment member 61 rotatably mounts gear 58 to the housing 75. A shifter gear pulley 59 is attached to the gear 58. Shifter cable 60 is positioned around the pulley 59. The cable 60 is further positioned around the twist shifter pulley 63. The twist shifter pulley 63 is attached to a twist shifter 62. The twist shifter 62 is able to be rotated by the user (i.e. twist shifter 62 mounted on or near a handle bar of a bicycle that allows the cyclist to shift or adjust final drive ratios). Alternatively, the shifter gear pulley 59 may be directly attached to the gear 94 thereby eliminating gear 58.

The user adjusts or twists the twist shifter 62 in a desired direction (i.e. one direction would be for increasing final drive ratio or "gear" and another direction would be for decreasing final drive ratio or "gear"). Referring to FIG. 18, when the twist shifter 62 is rotated or twisted, the cable 60 causes the pulley 59 and gear 58 to rotate in a certain direction. The rotation of gear 58 causes gear 94 to rotate in an opposite direction, and gear 94 causes the housing 92 to move away or towards the pinion gear 82. The gear 58 is wide enough to allow the gear 94 to stay engaged with it as the housing 92 is moved in and out of the housing 15. The rotation of the pinion gear 82 causes the transmission crank shaft 80 to decrease or increase in an angular position relative to the zero reference line C.

Power or force is applied to the pedal assembly 32. The pedal assembly 32 translates the rotational forces to the second embodiment transmission assembly 74. The translated rotational forces causes the gear 76 to rotate about an axis F in the manner shown in FIGS. 22 to 24. The assembly having coupled transmission crank shaft 80, pinion gear 82, and the rack gear 88 accordingly rotate as shown in FIGS. 22 to 24. As this assembly rotates to the various positions such as shown in FIGS. 22 to 24, the pinion gear 82 remains in contact with the rack gear 88.

Therefore, while gear 76 and the assembly are able to be rotated about the axis F, components of the assembly are able to be rotated, moved, or adjusted about other axes or to other positions. For example, while gear 76 and the assembly are able to be rotated about the axis F, pinion gear 82 is still able to be rotated about the axis G. Furthermore, rotation of components about axis F is independent of rotation of components about axis G. Therefore, shifting or adjusting of drive ratios may occur whether or not the drive gear 76 is being rotated (i.e. whether or not force is being applied to the pedals 38). Also, the drive gear 76 and assembly may be rotated in either direction. Therefore, the user may pedal either in the conventional manner or back pedal, and the driven device or bicycle will still be driven in the forward direction.

Referring to FIGS. 17, 25 and 26, drive ratios are adjusted by decreasing (i.e. FIG. 25) and increasing (i.e. FIG. 26) the angular position of the crank shaft 80 to respectively decrease and increase the radial drive circumference. The radial drive circumference provides the radial distance that the end 64A of cable/chain 64 travels during a revolution of the drive gear 76. Therefore, if the radial distance is decreased, a lower drive ratio (such as a lower gear) is provided, and if the radial distance is increased, a higher drive ratio (such as a higher gear) is provided. The smallest radial distance J that is able to be achieved would provide the lowest drive ratio reference (i.e. lowest gear reference) such as shown in FIG. 25 while the largest radial distance K that is able to be achieved would provide the highest drive ratio reference (i.e. highest gear reference) such as shown in FIG. 26. Continuous drive ratios are able to be achieved between the lowest and highest drive ratio references by being able to adjust the radial distance to any desired amount between the two references.

The above components, assemblies, driving components, and shifting components are not limited to the specific ones disclosed in this specification. Any suitable or equivalent components or assemblies may be used in conjunction with the present invention. Also, some assemblies may be integrated or combined together or may be separated. For example, the present assembly 14 combines the pedal assembly 32 as part of the assembly 14. However, the present assembly 14 may be made without the pedal assembly and may be made to adapt to a presently existing pedal assembly 32. As a further example, an electronically/computer driven and controlled shifting apparatus, that includes but is not limited to stepper motors or solenoids, may be implemented for changing the drive ratios of the present adjustable rotational transmission assembly 10.

Furthermore, the transmission assembly 10 may be made without the feature of allowing adjustment of the rotational drive radius and drive circumference wherein a single drive ratio is provided by the transmission assembly 10, and the embodiments 14 and 74 may generally have the same components as disclosed above but simply modified to provide such a single drive ratio. Also, the transmission drive gear 16 or 76 may be at least a gear, pulley, ring, or any other suitable driving component. Furthermore, the reciprocating component disclosed in this specification is a cable or chain, but the present invention is not in any way limited to a reciprocating component as a cable or chain. Any suitable reciprocating component such as a strap, belt, band, rope, or other such device may be used with the present invention.

The preferred embodiment of the invention is described above in the Figures and Detailed Description. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application and to enable others skilled in the art to best utilize the invention in various embodiments and with various modifications as are suited to the particular use contemplated. Also, the present invention is not in any way limited to the specific embodiments or configurations presented in this specification.

What is claimed is:

1. A rotational transmission assembly for a driven device comprising:
    a transmission housing;
    an input power drive gear coupled to the transmission housing for rotation about a drive axis;
    a mount assembly connected to said drive gear for rotation therewith;
    at least one variable length crank arm having a component attachment end for receiving a reciprocating component, said crank arm being connected to said mount assembly for rotation therewith;
    an adjustment gear located on said mount assembly and engaging said crank arm to vary the length thereof, and
    a control gear engaging the adjustment gear to impart rotation thereto and vary the circumference of the rotational path of the component attachment of said crank arm whereby the drive ratio to the driven device is changed.

2. The rotational transmission, assembly of claim 1 further comprising at least one bearing assembly that rotatably couples the input power drive gear to the transmission housing.

3. The rotational transmission assembly of claim 2 wherein the mount assembly is transversely mounted through the input power drive gear whereby the rotation of the input power drive gear rotates the rotational mount assembly about the drive axis.

4. The rotational transmission assembly of claim 3 wherein the mount assembly comprises at least one crank arm slide opening, and the at least one variable length crank arm slidingly mounts within said slide opening to allow adjustment of a position of said crank arm which adjusts the circumference of the rotational path and the drive ratio-to the driven device.

5. The rotational transmission of claim 4 further comprising a shifter assembly coupled to said crank arm.

6. The rotational transmission assembly of claim 5 wherein the shifter assembly further comprises:
    a pinion gear coupled to the adjustment gear;
    at least one slide mounting component coupled to the transmission housing;
    a rack support guide slidably coupled to the at least one slide mounting component and slidably adjusted to various positions proximate the input power drive gear;
    at least one bearing fitted into the rack support guide;
    a rotating rack support rotatably coupled to the at least one bearing, and
    a rack gear attached to the rotating rack support and engagingly coupled to the pinion gear to drive the adjustment gear for adjusting the position of said crank arm.

7. The rotational transmission assembly of claim 6 wherein the rack support guide has at least one inner threaded portion and at least one inner sliding portion, and wherein said slide positioning component is an adjustment threaded screw threadingly coupled to the said inner threaded portion.

8. The rotational transmission assembly of claim 7 further comprises a shifter gear coupled to the adjustment threaded screw wherein the shifter gear is able to couple to a shifter apparatus.

9. The rotational transmission assembly of claim 6 wherein the input power drive gear, the rack support guide, the rotating rack support, the at least one bearing, and the at least one bearing assembly are each a generally hollow ring structure.

10. The rotational transmission assembly of claim 6 wherein the at least one variable length crank arm has gear teeth to engagingly couple to gear teeth of the adjustment gear.

11. The rotational transmission assembly of claim 10 wherein the at least one variable length crank arm comprises two variable length crank arms wherein one of the two transmission crank arms extends from one side of the input power drive gear and another of the two transmission crank arms extends from another side of the input power drive gear.

12. The rotational transmission assembly of claim 3 further comprises a reciprocating component rotatably coupled to the component attachment end.

13. The rotational transmission assembly of claim 12 wherein the reciprocating component is a cable.

14. The rotational transmission assembly of claim 12 wherein the reciprocating component is a chain.

15. The rotational transmission assembly of claim 12 wherein the opposing end of the reciprocating component is attached to a free wheel hub of the driven device.

16. The rotational transmission assembly of claim 4 wherein the position of the variable length crank arm is adjusted between various positions ranging from a minimum length position and a maximum length position wherein the minimum length position provides a minimum rotational drive circumference and a minimum final drive ratio to the driven device, and wherein the maximum length position provides a maximum rotational drive circumference and a maximum final drive ratio to the driven device.

* * * * *